(12) United States Patent
Reitsma

(10) Patent No.: US 11,774,145 B2
(45) Date of Patent: *Oct. 3, 2023

(54) METHOD AND APPARATUS FOR INSTALLING GEOTHERMAL HEAT EXCHANGER

(71) Applicant: Geosource Energy Inc., Caledonia (CA)

(72) Inventor: Stanley Reitsma, Caledonia (CA)

(73) Assignee: Geosource Energy Inc., Caledonia (CA)

( * ) Notice: Subject to any disclaimer, the term of this patent is extended or adjusted under 35 U.S.C. 154(b) by 41 days.

This patent is subject to a terminal disclaimer.

(21) Appl. No.: 17/367,688

(22) Filed: Jul. 6, 2021

(65) Prior Publication Data

US 2021/0333020 A1  Oct. 28, 2021

Related U.S. Application Data

(63) Continuation of application No. 16/131,156, filed on Sep. 14, 2018, now Pat. No. 11,085,670.

(51) Int. Cl.
*F24T 10/15* (2018.01)

(52) U.S. Cl.
CPC .................................. *F24T 10/15* (2018.05)

(58) Field of Classification Search
CPC ......... E21B 29/005; F24T 10/15; F24T 10/40; F24T 2010/53
See application file for complete search history.

(56) References Cited

U.S. PATENT DOCUMENTS

| 1,088,135 A | 2/1914 | Fagan |
| 1,789,995 A | 1/1931 | Barkis |
| 1,801,424 A * | 4/1931 | Gray .................... E21B 29/005 |
| | | 166/55.8 |

(Continued)

FOREIGN PATENT DOCUMENTS

| AU | 2008241236 B2 | 10/2008 |
| DE | 102007054185 B3 | 5/2009 |

(Continued)

OTHER PUBLICATIONS

Extended European Search Report from the European Patent Office dated May 18, 2020 for corresponding European Application No. 19196678.7.

*Primary Examiner* — Caroline N Butcher
(74) *Attorney, Agent, or Firm* — Sean Mellino

(57) ABSTRACT

A borehole is bored to a borehole target depth in a site and a geothermal heat exchanger is inserted into and then secured in the borehole at the desired depth. Once the heat exchanger has been secured in the borehole, the heat exchanger has a closed distal end and an open proximal end and has at least one fluid path between the closed distal end and the open proximal end, with installation fluid disposed in the fluid path(s). After securing the heat exchanger in the borehole and before excavation of a portion of the site immediately surrounding the borehole, the heat exchanger is temporarily sealed by installing, through the open proximal end, at least one respective internal seal in each fluid path. For each fluid path, the internal seal(s) will be disposed below a respective notional subgrade depth and excavation of the site immediately surrounding the borehole can proceed.

12 Claims, 21 Drawing Sheets

(56) References Cited

U.S. PATENT DOCUMENTS

| | | |
|---|---|---|
| 1,927,310 A | 9/1933 | Edwards |
| 2,200,172 A | 5/1940 | Howard |
| 2,208,011 A | 7/1940 | Anderson |
| 3,283,405 A | 11/1966 | Braswell |
| 5,253,722 A | 10/1993 | Laffkas |
| 5,634,515 A | 6/1997 | Lambert |
| 5,862,866 A | 1/1999 | Springer |
| 6,035,949 A | 3/2000 | Altschuler et al. |
| 7,401,641 B1 | 7/2008 | Wiggs |
| 9,109,398 B2 | 8/2015 | Harris et al. |
| 2010/0040419 A1 | 2/2010 | Roussy |
| 2010/0294456 A1 | 11/2010 | Taraba et al. |
| 2012/0175077 A1 | 7/2012 | Lehmann et al. |
| 2012/0282032 A1 | 11/2012 | Desmeules |
| 2013/0087306 A1 | 4/2013 | Winn, Jr. |
| 2015/0316296 A1* | 11/2015 | Yang .............. F28D 20/0052 165/157 |
| 2016/0245550 A1 | 8/2016 | Sonju et al. |
| 2017/0268803 A1* | 9/2017 | Cauchy ................ F24T 10/17 |
| 2018/0056490 A1* | 3/2018 | Illingworth ............ E21B 33/12 |

FOREIGN PATENT DOCUMENTS

| | | |
|---|---|---|
| DE | 102012103499 A1 | 10/2013 |
| DE | 102015204609 A1 | 9/2016 |
| EP | 1644671 B1 | 2/2008 |
| EP | 1853789 B1 | 4/2012 |
| JP | 2012127116 A | 7/2012 |
| JP | 201783053 A | 5/2017 |
| JP | 6232962 B2 | 11/2017 |
| KR | 100880675 B1 | 1/2009 |
| KR | 1020130129722 A | 11/2013 |
| KR | 101525431 B1 | 6/2015 |
| KR | 101525431 B1 * | 6/2015 |
| KR | 101621751 B1 | 5/2016 |
| KR | 101640589 B1 | 7/2016 |
| KR | 101658572 B1 | 9/2016 |
| KR | 101756753 B1 | 7/2017 |
| KR | 1020170139739 A | 12/2017 |
| WO | 2012051338 A1 | 4/2012 |
| WO | 2017156314 A1 | 9/2017 |

\* cited by examiner

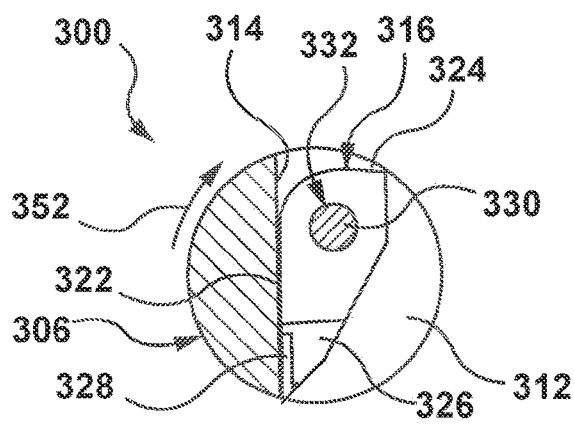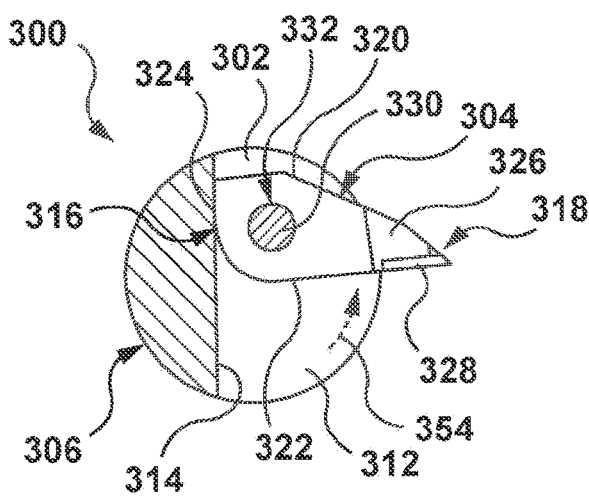
FIG. 3F  FIG. 3G
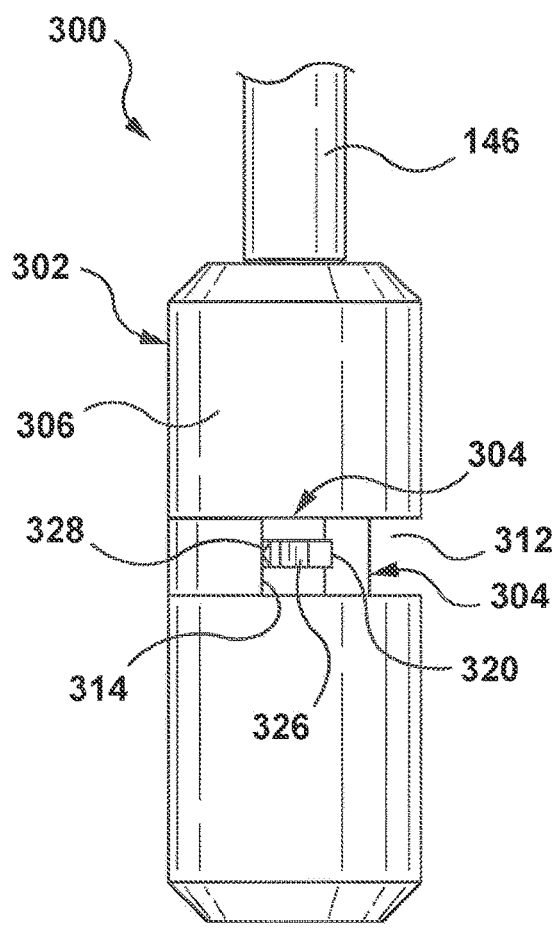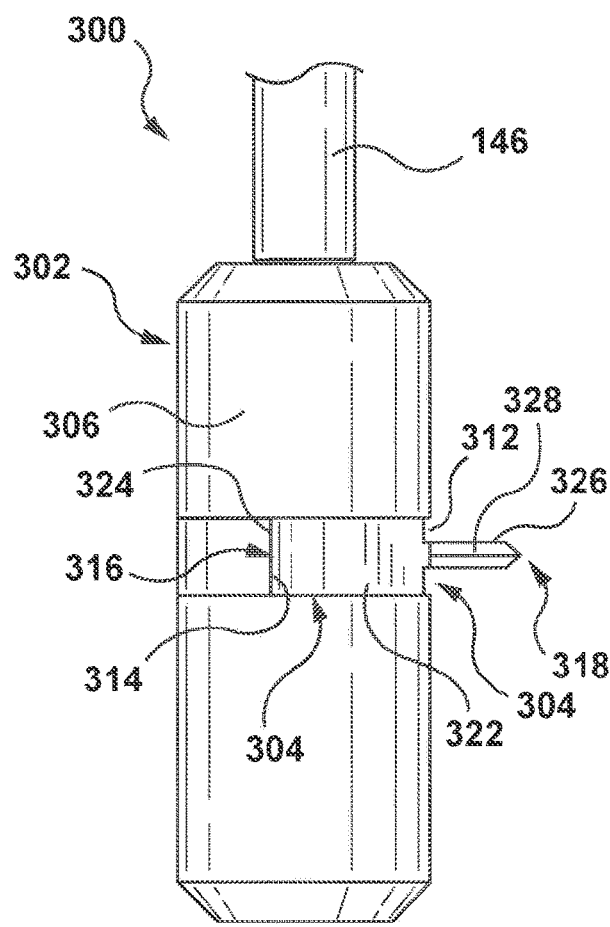
FIG. 3H  FIG. 3I

METHOD AND APPARATUS FOR INSTALLING GEOTHERMAL HEAT EXCHANGER

CROSS-REFERENCE TO RELATED APPLICATIONS

This application is a continuation of U.S. patent application Ser. No. 16/131,156 entitled "METHOD AND APPARATUS FOR INSTALLING GEOTHERMAL HEAT EXCHANGER" filed on Sep. 14, 2018. The entirety of the above-noted application is incorporated by reference herein.

TECHNICAL FIELD

The present invention relates to geothermal heat exchangers, and more particularly to installation of geothermal heat exchangers.

BACKGROUND

Geothermal heat exchangers are tubes (sometimes referred to as "loops") that are installed underground and coupled to the heating and/or cooling system of a building (e.g. HVAC system). Fluid from the building heating/cooling system circulates in the tubes to exchange heat with the surrounding underground substrate. Typically, there is a temperature gradient between the ambient air and the underground substrate; the substrate is usually cooler than the air in summer and warmer than the air in winter. As such, the heat exchange can reduce the energy input required to achieve climate control within the building.

A geothermal borehole is required prior to installation of a geothermal heat exchanger. For a geothermal heat exchanger installed below a yet-to-be-constructed building, the geothermal heat exchanger is typically installed after completion of excavation at the building site. This avoids the problem of having the loop interfere with excavation, and also avoids the risk of excavation debris entering the tube and obstructing fluid flow therethrough. However, this approach requires that construction operations, at least around the area of the borehole(s), be delayed during installation and testing of the geothermal heat exchanger.

SUMMARY

In one aspect, the present disclosure describes a method of installing a geothermal heat exchanger. A borehole is bored to a borehole target depth in the site and, after boring the borehole, a geothermal heat exchanger is inserted into the borehole to a desired heat exchanger depth and then secured in the borehole at the desired heat exchanger depth. The heat exchanger may be, for example, a such as a single U-loop or a multiple U-loop, or may comprise at least an outer tube of a concentric heat exchanger.

Once the heat exchanger has been secured in the borehole, the heat exchanger has a closed distal end and an open proximal end and has at least one fluid path between the closed distal end and the open proximal end, with installation fluid disposed in the fluid path(s) of the heat exchanger. After securing the heat exchanger in the borehole and before excavation of a portion of the site immediately surrounding the borehole, the heat exchanger is temporarily sealed between the closed distal end and the open proximal end by installing, through the open proximal end, at least one respective internal seal in each fluid path. For each fluid path, the internal seal(s) will be disposed below a respective notional subgrade depth.

In one preferred implementation, after sealing the heat exchanger, the heat exchanger is cut above the uppermost seal(s) to produce at least one above-seal cut portion of the heat exchanger above the uppermost seal(s), and each above-seal cut portion of the heat exchanger is removed and the portion of the site immediately surrounding the borehole is excavated above a lowermost notional subgrade depth. Optionally, after securing the heat exchanger in the borehole and before excavation of the site, the heat exchanger may be tested. After excavating the portion of the site immediately surrounding the borehole, the seals may be removed for connection of the heat exchanger to supply/return conduits. In some preferred embodiments, the installation fluid remains in the heat exchanger during securing of the heat exchanger in the borehole and temporarily sealing the heat exchanger.

Cutting the heat exchanger and removing each above-seal cut portion of the heat exchanger may be carried out before excavation of the site or during excavation of the site. In some embodiments, cutting is performed incidentally by excavating machinery during excavation of the portion of the site immediately surrounding the borehole.

Cutting the heat exchanger may be carried out by inserting a pipe cutting tool into the open proximal end and then cutting the heat exchanger from the inside, for example by using a specialized pipe cutting tool.

In another aspect, the present disclosure describes a pipe cutting tool. The pipe cutting tool comprises a main body having an axially-extending outer guide surface adapted to guide the main body axially along an inside of a pipe along a pipe axis, with an arm recess in the guide surface of the main body, and a cuffing arm. The cutting arm has a pivot end that has a cam surface, a back-edge, a cutting edge and a cutting end opposite the pivot end, with the cutting end having a cutting head disposed along the cutting edge. The arm recess has a stop surface disposed therein, and the cutting arm is pivotally coupled at its pivot end to the main body within the arm recess so as to be pivotable, relative to the main body, about a pivot axis that is substantially parallel to the pipe axis. The cutting arm is pivotable between a retracted position in which the cutting arm is retracted into the arm recess so that the cutting edge faces the stop surface, and an extended position in which the cutting end of the cutting arm extends beyond the guide surface to expose the cutting head and the cam surface engages the stop surface to brace the cutting arm against force applied to the cutting head. A biasing member acts between the main body and the cutting arm to urge the cutting arm toward the extended position.

In some embodiments, a first axial end of the main body has an axially aligned drive rod recess that is threaded for threadedly receiving a drive rod. In some particular embodiments, the cutting arm is pivotally coupled to the main body by a pivot pin passing through a pivot aperture in the pivot end of the cutting arm. A first end of the pivot pin is received in a pivot pin recess on a same axial side of the arm recess as the drive rod recess. A second end of the pivot pin is received in a bushing receptacle wherein a bushing is disposed in the bushing receptacle on an opposite axial side of the arm recess from the drive rod recess. The bushing is trapped in the bushing receptacle by a setscrew that is threadedly received in a setscrew recess on the opposite axial side of the arm recess from the drive rod recess.

The cutting head may be adapted to receive a blade facing the cutting edge, or may have an integral blade facing the cutting edge.

BRIEF DESCRIPTION OF THE DRAWINGS

These and other features will become more apparent from the following description in which reference is made to the appended drawings wherein:

FIG. 3F is a top sectional view of the pipe cutting tool of FIG. 3A, showing the cutting arm in a retracted position;

FIG. 3G is a top sectional view of the pipe cutting tool of FIG. 3A, showing the cutting arm in an extended position;

FIG. 3H is a first side elevation view of the pipe cutting tool of FIG. 3A, showing the cutting arm in a retracted position;

FIG. 3I is the same side elevation view as in FIG. 3H, showing the cutting arm in an extended position;

DETAILED DESCRIPTION

Reference is now made to FIGS. 1A to 1M, which show an illustrative method of installing a geothermal heat exchanger according to an aspect of the present disclosure.

Figure 1A:
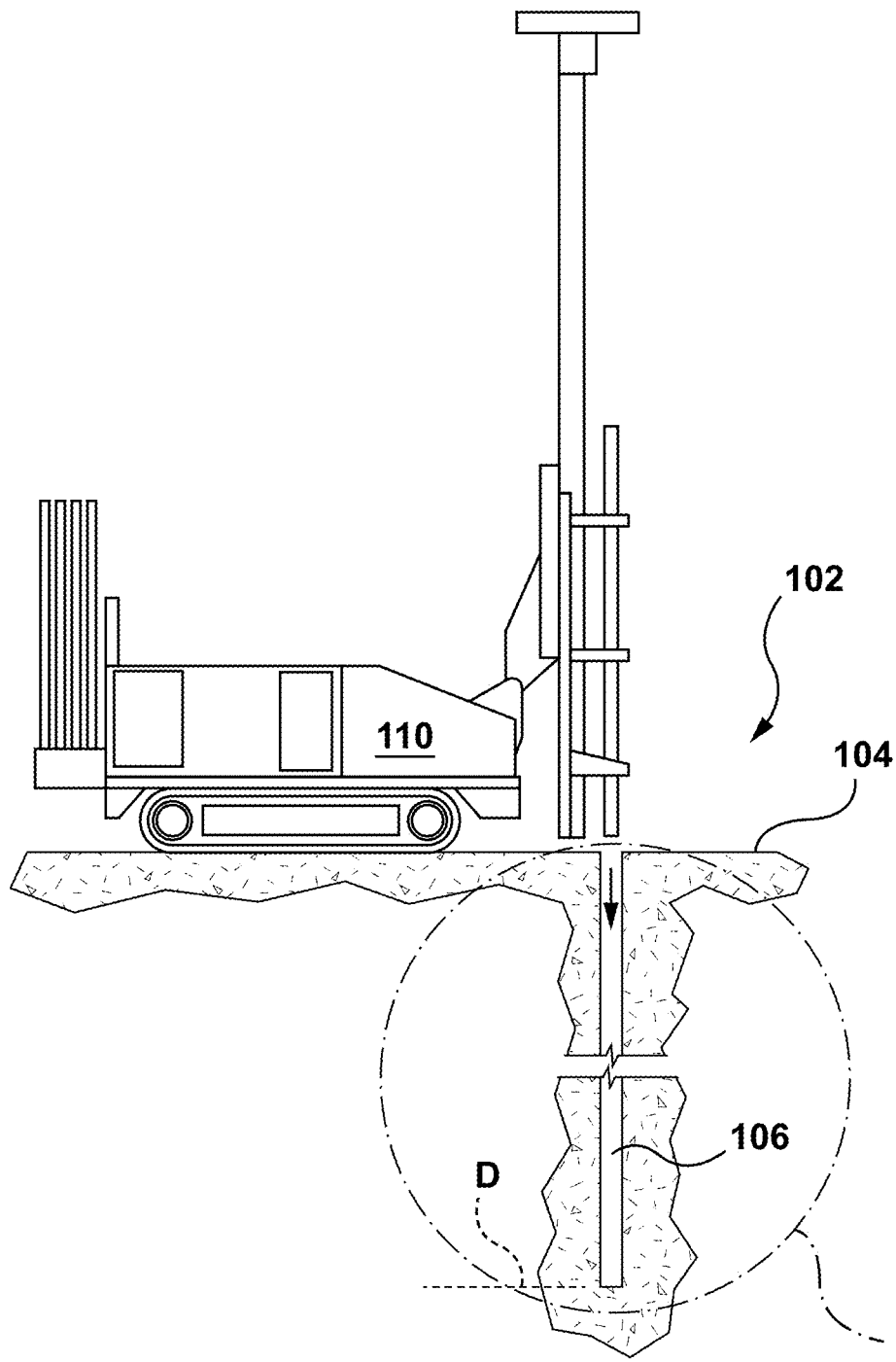
FIG. 1A shows boring of a borehole, according to an aspect of the present disclosure.

Beginning with FIG. 1A, at a site 102, such as the substrate 104 upon which construction of a new building is planned, a borehole 106 is bored to a borehole target depth in the site 102. In the illustrated embodiment, a hydraulic drill rig 110 is used to form the borehole 106. A hydraulic drill rig may be equipped, for example, with a single, dual, or sonic top drive.

Optionally, a casing (not shown) may be used to stabilize the overburden (usually made up of clays, sands, and gravels for the most part), and an open hole (i.e. no casing) is drilled in the bedrock if encountered. A casing may be installed following drilling overburden where air or mud rotary drilling is used, or a casing may be installed simultaneously with drilling of the overburden using a rig equipped with dual rotary or sonic top drive, or with an overburden drilling system. Casing used in construction of a geothermal borehole is normally temporary casing, meaning that it is removed following installation of the geothermal heat exchanger into the borehole. The casing size must be large enough to accommodate the drill bit size used to drill the bedrock below; common sizes include 133 mm outside diameter (OD) (5.5") and 165 mm OD (6.5"). Bedrock is normally drilled with either down-the-hole hammer (for hard rock such as granite), or with PDC bits (for softer sedimentary rock). The fluid used to drill the rock is often compressed air but water or mud rotary drilling can also be used. Mud rotary drilling may also be used to drill an open hole in overburden, usually to a maximum depth of 150 metres and more frequently to depths of less than 100 metres. Mud rotary drilling of an open hole is not commonly used to greater depths because it becomes very difficult to maintain hole stability and to get the geothermal heat exchanger to the target depth. The borehole size is dictated by heat exchanger geometry and grouting requirements. Typical minimum borehole size for a 32 mm (1.25") single U-loop heat exchanger is 98 mm and for a 38 mm (1.5") single U-loop heat exchanger is 108 mm. Larger hole sizes are often used due to typical tooling of drilling equipment and 152 mm (6") is very common among water well drilling equipment. Boreholes are typically vertical but can be drilled in on an angle or directionally drilled using steerable drilling technology.

Selection of the drilling approach depends on geology, availability of equipment, target depth of the geothermal heat exchanger, and regulatory requirements, and is within the capability of one skilled in the art.

Figure 1B:
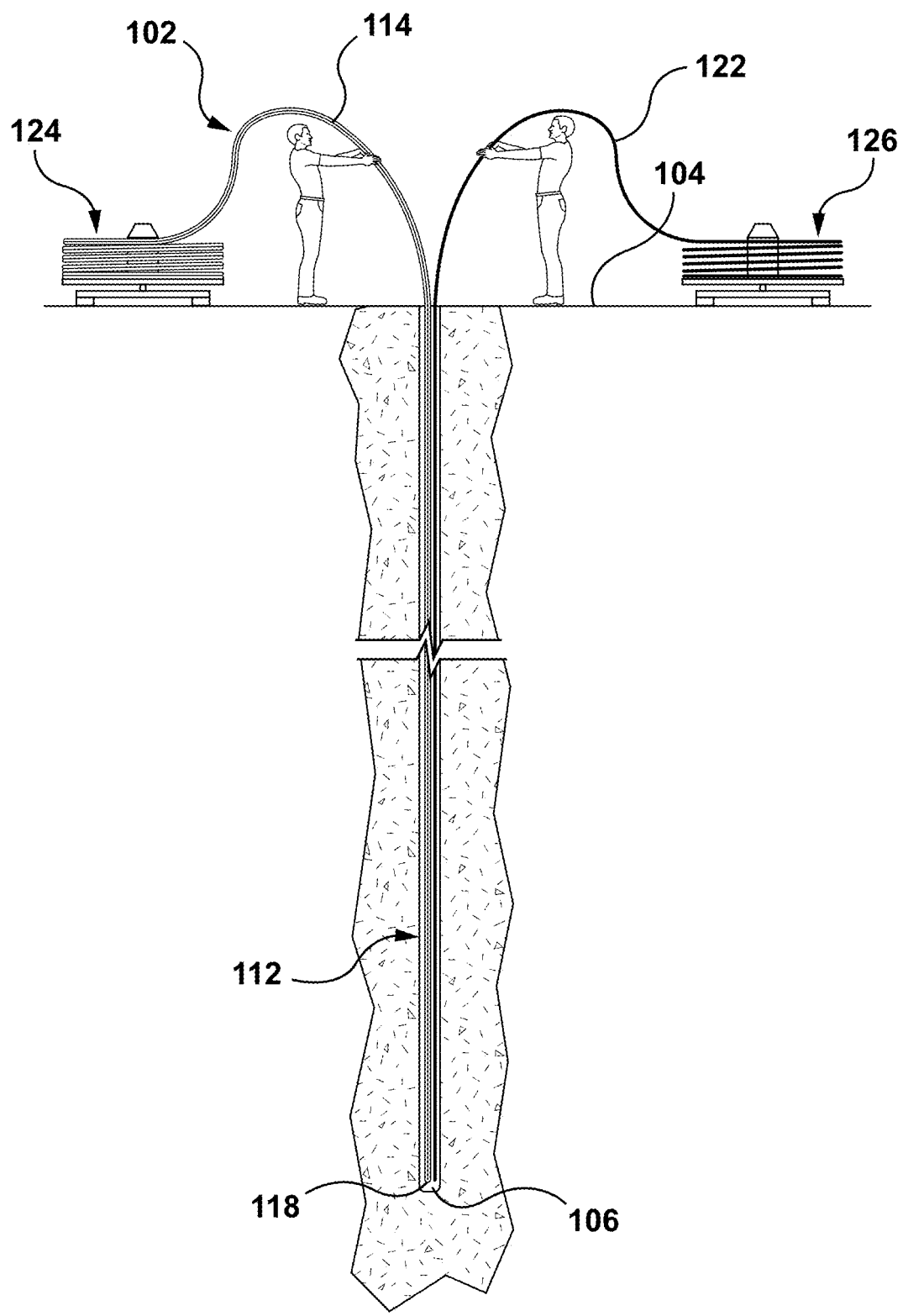
FIGS. 1B and 1Ba show insertion of a geothermal heat exchanger into the borehole of FIG. 1A.
Figure 1B:
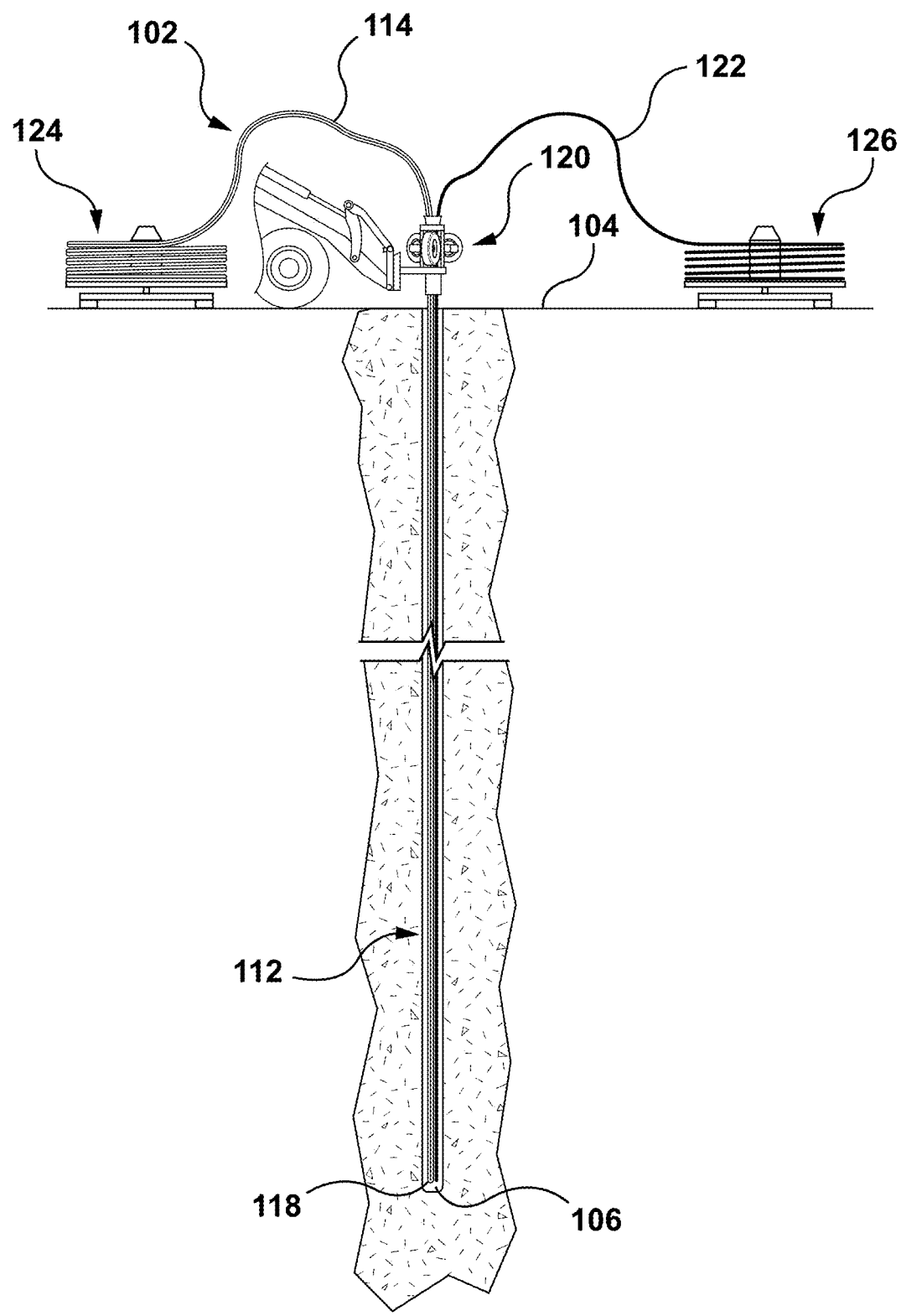

Referring now to FIG. 1B and FIG. 1Ba, after boring the borehole 106, a geothermal heat exchanger 112 is inserted into the borehole 106 to a desired heat exchanger depth, which may be the same as or slightly above the borehole depth D.

Figure 2A:
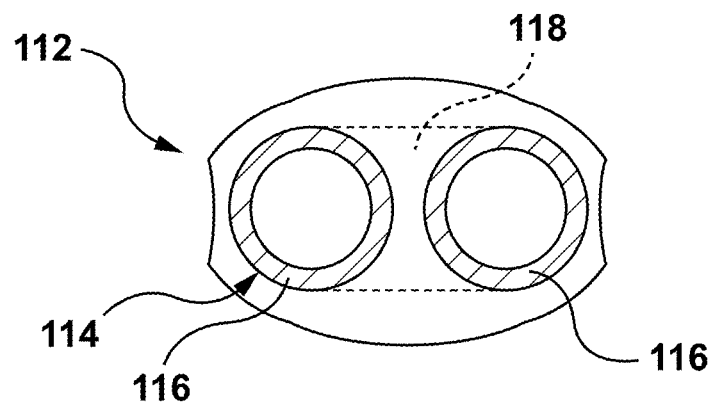
FIG. 2A is a cross-sectional view of an illustrative closed-loop geothermal heat exchanger having a single U-loop configuration.
Figure 2B:
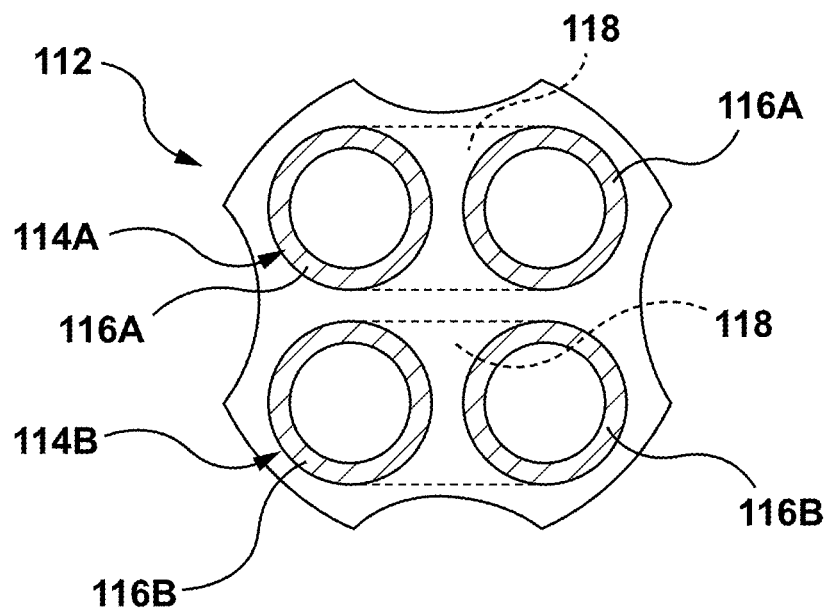
FIG. 2B is a cross-sectional view of an illustrative closed-loop geothermal heat exchanger having a double U-loop configuration.
Figure 2C:
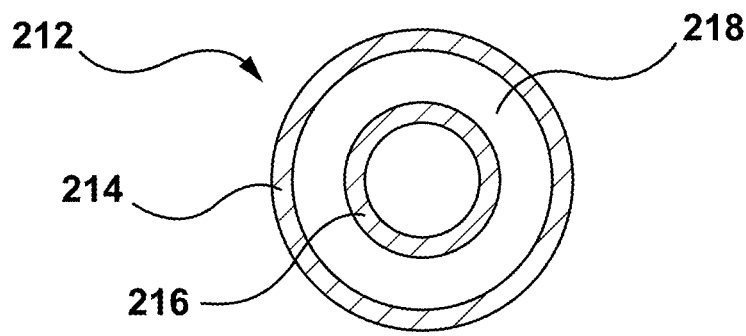
FIG. 2C is a cross-sectional view of an illustrative closed-loop geothermal heat exchanger having a concentric configuration.

The geothermal heat exchanger 112 is typically in the form of one or more tubular pipes in a U-shaped configuration (referred to as a "U-loop"). The most common closed-loop geothermal heat exchanger configuration is a single U-loop, as shown in FIG. 2A, which consists of two pipes 114 joined by a 180-degree elbow fitting 118 at the distal end of the heat exchanger 112 so as to form two continuous parallel arms 116 extending the length of the heat exchanger 112. Double U-loop configurations, as shown in FIG. 2B, are common in Europe, with two pairs of pipes 114A, 114B each joined by a respective 180-degree elbow fitting 118 to form two respective pairs of parallel arms 116A, 116B. Thus, in a double-U-loop configuration, there are four continuous parallel arms 116A, 116B running the length of the heat exchanger 112 with a double 180-degree elbow 118A, 118B at the distal end of the heat exchanger 112. In another embodiment, as shown in FIG. 2C, an alternate form of geothermal heat exchanger 212 may be a concentric or coaxial heat exchanger comprising an outer tube 214 and an inner tube 216 in fluid communication with one another, with the outer tube 214 having a closed distal end 218 and the inner tube 216 having an open distal end that terminates short of the closed distal end 218 of the outer tube 214. Where a concentric heat exchanger 212 is used, optionally only the outer tube 214 need be inserted at the step shown in FIGS. 1B and 1Ba. Other configurations are available but less common such as various pipe cross sections that are not necessarily round (e.g. GI4™), and multiple U-loops may have more than two pipes (e.g. Twister™).

Common U-loop pipe sizes range of ¾" IPS to 1.5" IPS with wall thickness from SDR9 to SDR13.5 (SDR is the pipe diameter to wall thickness ratio). The most common pipe material is high density polyethylene, such as HDPE 3608 or HDPE 4710 although some other materials or thermally enhanced HDPE are used occasionally.

In each case, that is, whether a U-loop heat exchanger 112, a concentric heat exchanger 212 or another configuration, the heat exchanger has a closed distal end (e.g. the elbow(s) 118 or the closed end 218 of the outer tube 214).

Returning to FIG. 1B and FIG. 1Ba, it will be seen that the illustrative geothermal heat exchanger 112 is a single U-loop heat exchanger 112 comprising a flexible pipe 114 whose elbow 118 forms the closed distal end.

Insertion of the geothermal heat exchanger 112 into the borehole 106 may be carried out manually, as shown in FIG. 1B, or with a mechanical system 120, as shown in FIG. 1Ba. Larger pipe diameters (e.g. 1.25" and 1.5") and deep boreholes usually make mechanical insertion necessary. Both manual and mechanical insertion are within the capability of one skilled in the art.

After inserting the heat exchanger 112 into the borehole 106, the heat exchanger 112 is secured in the borehole 106 at the desired heat exchanger depth. The annular space 128 (see FIGS. 1C to 1E) between the heat exchanger 112 and the wall of the borehole 106, as well as any space 130 between the arms 116 of the heat exchanger 112, is normally grouted using bentonite-based or cement-based grouts, with bentonite-based grouts being more common because of ease of use and improved performance. Thermal enhancement material is commonly used with bentonite-based grout to improve heat exchanger performance. These materials are typically silica sand and more recently, graphite material. Before introduction of the grout, the heat exchanger 112 is filled with an installation fluid 115 (such as water) maintained at a suitable pressure to maintain the structural integrity of the pipe 114 (i.e. prevent inward collapse).

Figure 1C:
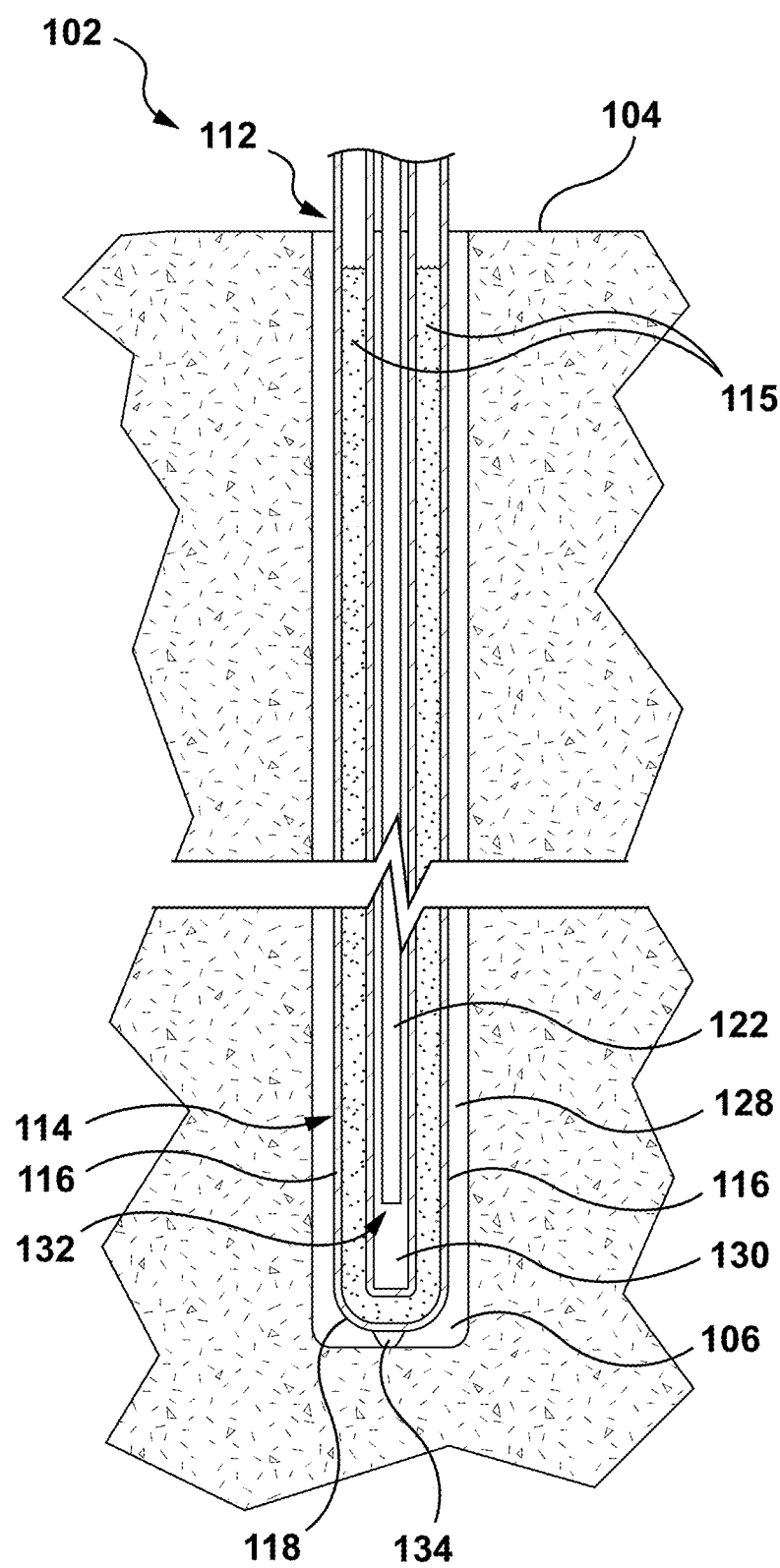
FIGS. 1C to 1E show securing the heat exchanger of FIGS. 1B and 1Ba in the borehole of FIG. 1A.
Figure 1D:
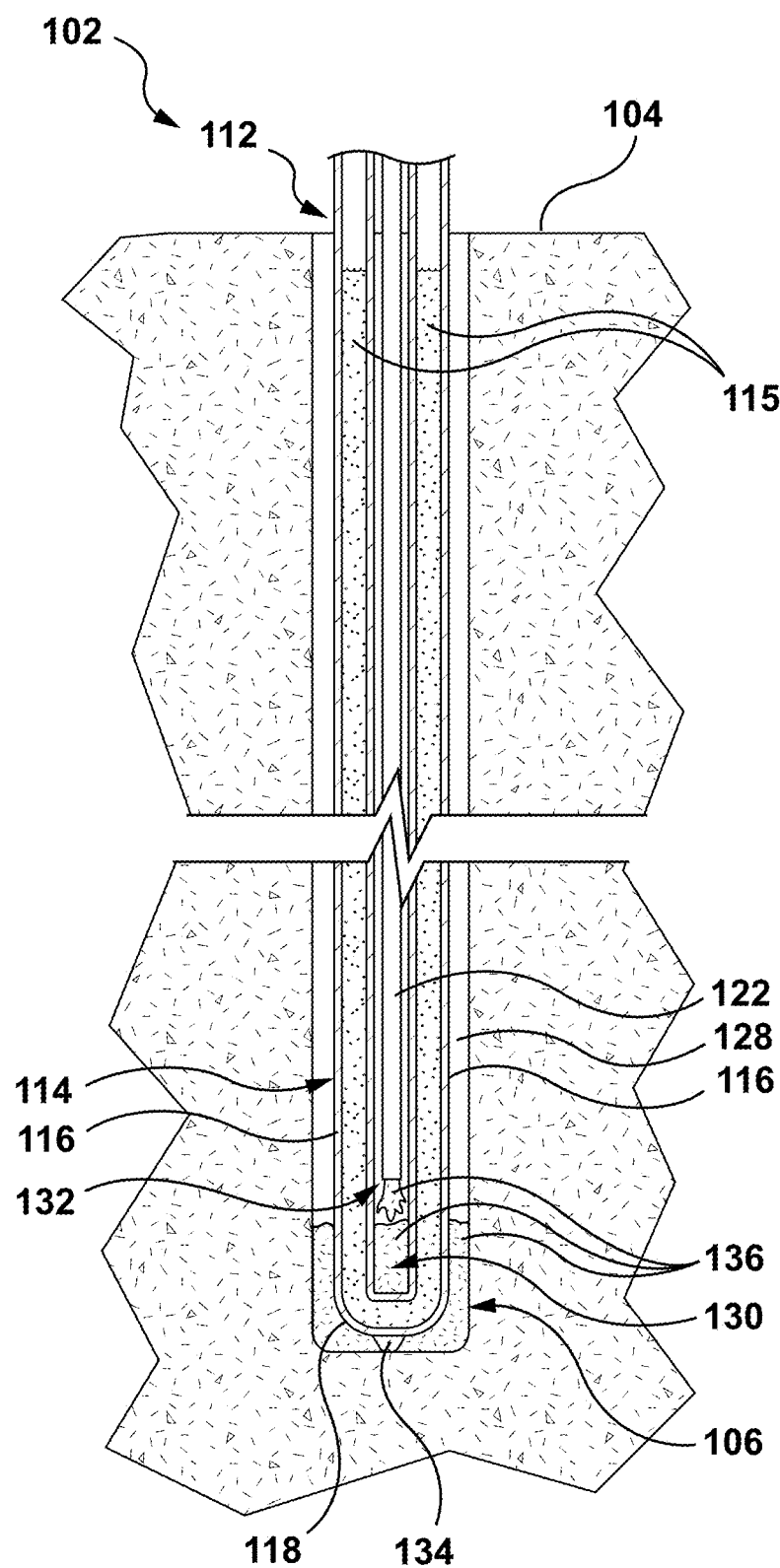
Figure 1E:
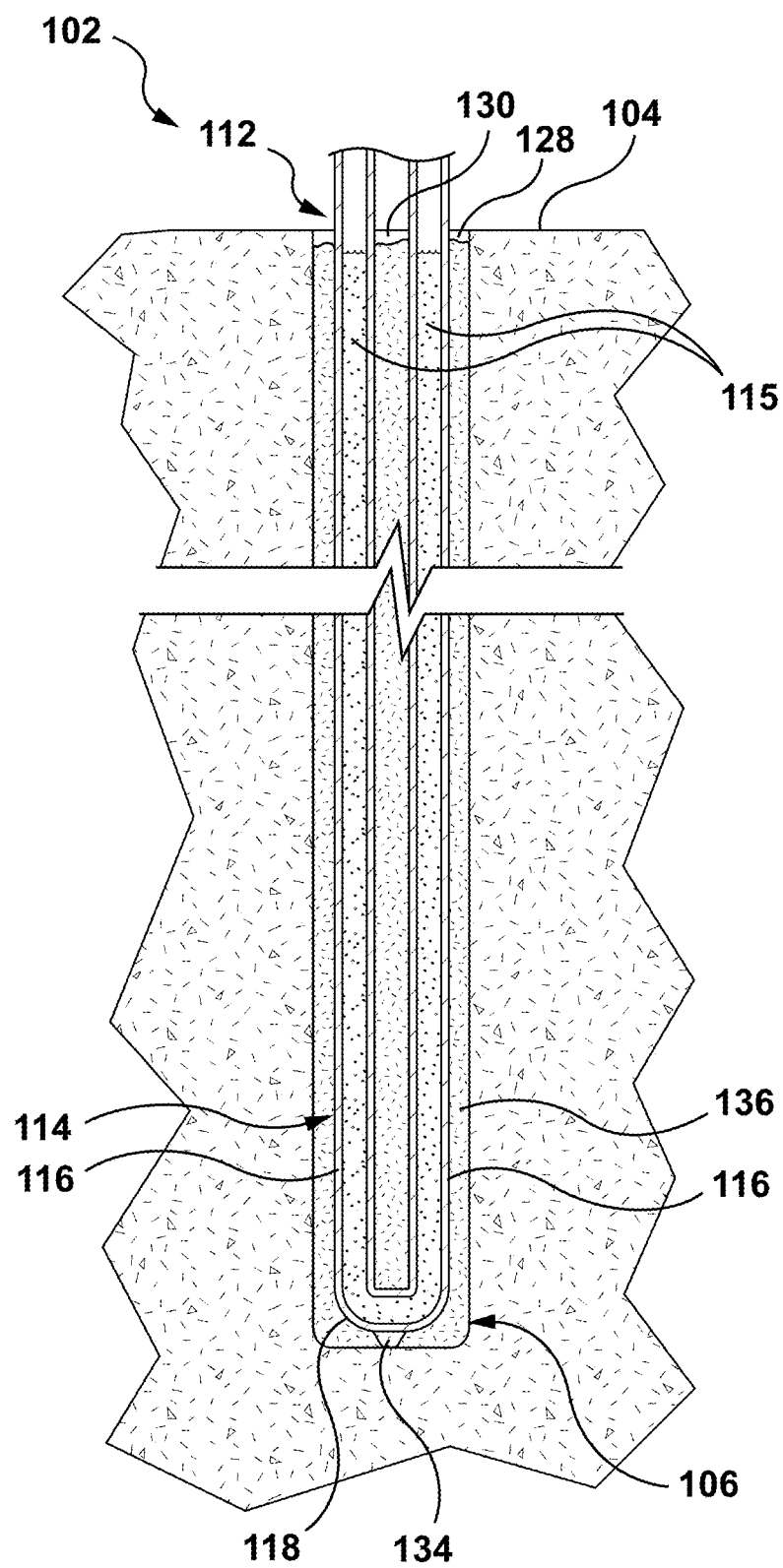

To apply the grout, a tremie line 122 is inserted into the borehole 106. Typically, the pipe 114 and tremie line 122 will be fed off of respective coils 124, 126 and inserted at the same time (see FIGS. 1B and 1Ba). The tremie line 122 may also be placed into the borehole following the insertion of the heat exchanger 112 into the borehole 106. As can be seen in FIGS. 1C to 1E, with a U-loop configuration the tremie line 122 is typically positioned between the arms 116 of the heat exchanger 112.

At commencement of grouting, the outlet end 132 of the tremie line 122 is initially positioned near the distal end of the heat exchanger, as shown in FIG. 1C. The elbow 118 of the heat exchanger 112 may rest on a support 134 as shown, which support may double as a plumb-weight, or the elbow 118 of the heat exchanger 112 may rest directly on the bottom of the borehole 106, or the heat exchanger 112 may simply be suspended in the borehole 106 while the grout is applied.

Grout 136 is injected into the borehole 106, as shown in FIG. 1D, until the outlet end 132 of the tremie line 122 is submerged in the grout 136 several metres below the surface or meniscus of the grout 136. In this way, the grout 136 will push any water or other material out of the borehole 106, resulting in a continuous column of grout in the borehole 106. As the is borehole 106 is grouted, the tremie line 122 is pulled back out of the borehole while keeping the outlet end of the tremie line 122 submerged in the grout 136 until the borehole 106 is substantially filled, as shown in FIG. 1E. After the grout 136 has set, the excess length of the arms 116 of the pipe 114 that protrude beyond the mouth of the borehole 106 can be cut so that they are approximately flush with the surface of the substrate 104 in which the borehole 106 is formed, so as to provide the heat exchanger 112 with an open proximal end 138, as shown in (e.g.) FIG. 1F. Alternatively, although less preferred, the pipe 114 can be pre-cut so that it will have a length corresponding to the depth of the borehole 106, or may be cut before grouting.

Where casing is used, grout is placed in the casing immediately prior to pulling the casing such that the grout has not yet 'set up' or stiffened so that the grout slumps out of the casing as it is pulled out of the borehole. As casing is pulled, grout is then used to top up the borehole so that the borehole is completely filled with grout once all casing has been extracted from the ground.

Once the heat exchanger 112 has been inserted and the borehole 106 has been grouted (or the heat exchanger 112 is otherwise secured in the borehole 106), the integrity of the heat exchanger 112, the depth of the heat exchanger 112, and potentially the quality of the grout 106 around the heat exchanger 112 may all be tested. Testing the depth and grout quality requires access to the heat exchanger 112 from the surface 104 of the site 102 to the full depth. Pressure testing also requires surface access and hydraulic continuity, but it does not necessarily require access to the bottom of loop, thereby allowing internal seals or plugs to be placed at some depth within the heat exchanger. The above testing is within the capability of one skilled in the art, now informed by the present disclosure. Thus, after securing the heat exchanger 112 in the borehole 106, the usual testing of the heat exchanger 112 can be carried out before excavation of the portion 140 (FIG. 1I) of the site 102 immediately surrounding the borehole 106.

As noted above, the heat exchanger has a closed distal end (e.g. the elbow(s) 118 or the closed end 218 of the outer tube 214) and, at least after being secured in the borehole 106 after installation, has an open proximal end 138 (e.g. the ends of the pipe(s) 114, 114A, 114B distal from the elbow(s) 118 or the end of (at least) the outer tube 214 remote from the closed distal end 218). The open proximal end 138 is proximal to the surface of the substrate 104 of the site 102. The heat exchanger 112 also has at least one fluid path between the closed distal end 118 and the open proximal end 138 (e.g. provided by the pipe(s) 114, 114A, 114B, 214, 216).

Following insertion (FIGS. 1B/1Ba), grouting (FIG. 1C to 1E), and testing, internal seals (e.g. plugs) can be placed in the heat exchanger 112 from the open proximal end 138 at one or more notional subgrade depths to inhibit debris from entering the heat exchanger 112. The term "notional subgrade depth", as used herein, refers to a depth below which no construction excavation is anticipated, at least within the portion 140 of the site 102 immediately surrounding the borehole 106. As a precaution, there may be multiple notional subgrade depths, with seals being placed below each, as described further below. The optional provision of additional notional subgrade depth(s) could account for the need to excavate deeper than expected due to construction exigencies, errors by operation of the construction equipment, etc. While optionally seals could be placed below only the lowermost notional subgrade depth, this increases the risk that debris will enter the heat exchanger above the seals.

Figure 1F:
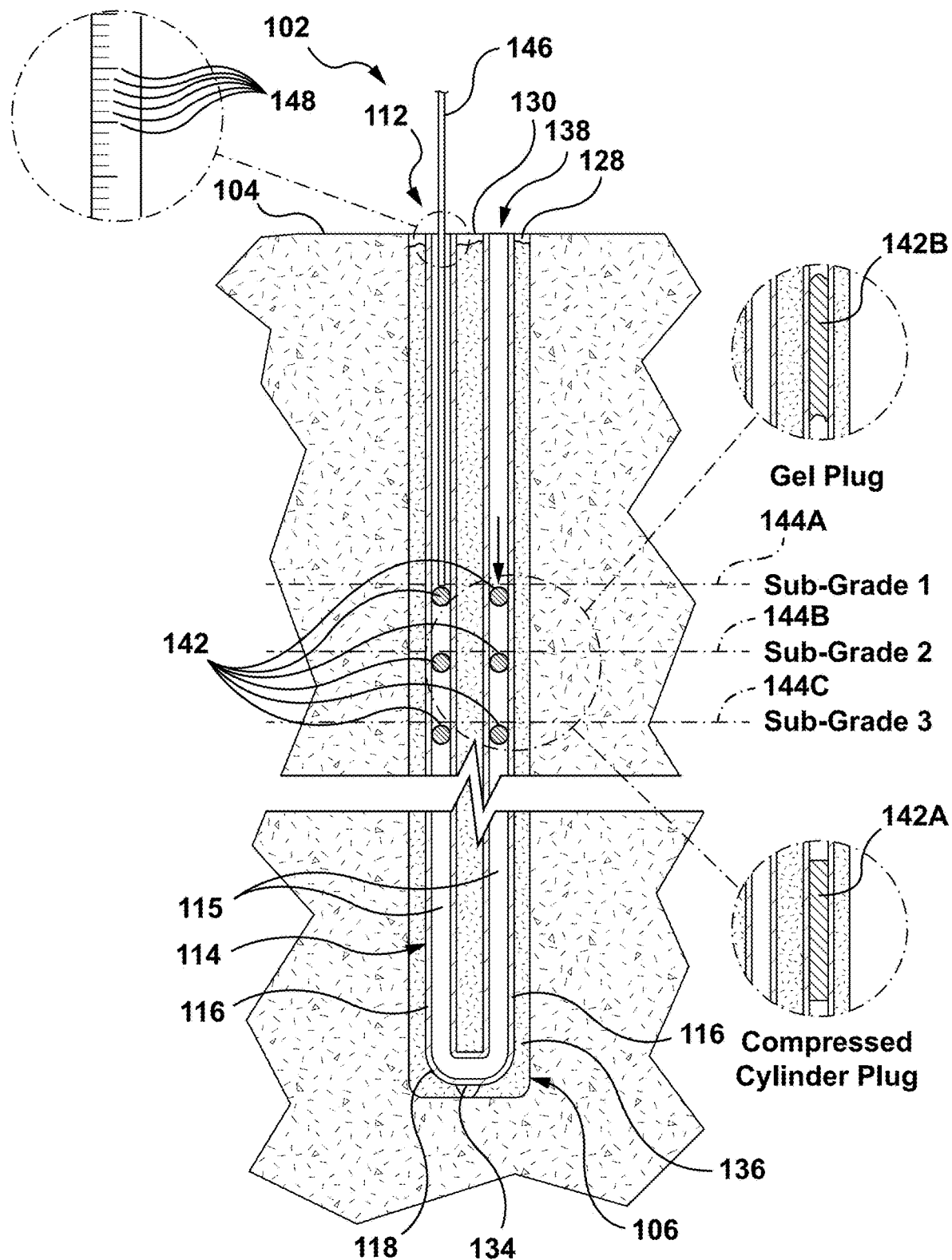
FIG. 1F shows temporary sealing of the heat exchanger of FIGS. 1B and 1Ba.

Referring now to FIG. 1F, after securing the heat exchanger 112 in the borehole 106 and before excavation of a portion 140 (see FIG. 1I) of the site 102 immediately surrounding the borehole 106, the heat exchanger 112 is temporarily sealed. The term "portion of the site immediately surrounding the borehole", as used herein, refers to the region (portion of the site) that is within five meters, preferably within three meters and more preferably within one meter of the borehole 106, measured radially from the outer circumference of the borehole 106. Excavation of other portions of the site 102, i.e. those other than the portion 140 of the site 102 immediately surrounding the borehole 106, may be carried out before temporarily sealing the heat exchanger 112. Thus, other construction activities may proceed on other parts of the site 102 during, for example, formation of the borehole 106, installation of the heat exchanger 112 and grouting of the heat exchanger 112, is before temporarily sealing the heat exchanger 112.

Continuing to refer to FIG. 1F, the heat exchanger 112 is temporarily sealed between the closed distal end 118 (or 218) and the open proximal end 138 by installing, through the open proximal end 138, at least one respective internal seal in each fluid path, e.g. the pipe(s) 114 (or 114A, 114B, 214, 216). The internal seals may take a wide variety of forms, and may have a shape adapted to the particular type of heat exchanger. For example, and without limitation, an internal seal may comprise one or more of a compressible foam ball plug 142 as shown in the main portion of FIG. 1F, a compressible foam cylinder plug 142A as shown in the lower right side enlargement in FIG. 1F, or a gel plug 142B as shown in the upper right side enlargement in FIG. 1F, each of which is described further below. Each of the seals (e.g. ball plugs 142) is disposed below a respective notional subgrade depth 144A, 144B, 144C.

As noted above, in some embodiments, there may be multiple notional subgrade depths, with seals being placed at each. For example, it may be expected that excavation will not continue below (e.g.) 10 meters from the surface 104, which would be a first notional subgrade depth 144A, but a second notional subgrade depth 144B of (e.g.) 10.5 meters and a third notional subgrade depth 144C of (e.g.) 11 meters may also be provided. These are merely examples of subgrade depths and are not intended to be limiting. Seals (e.g. ball plugs 142) are disposed between the first notional subgrade depth 144A and the second notional subgrade depth 144B, between the second notional subgrade depth 144B and the third notional subgrade depth 144C, and below the third notional subgrade depth 144C. Hence, there are seals (e.g. ball plugs 142) disposed beneath each of the first notional subgrade depth 144A, the second notional subgrade depth 144B and the third notional subgrade depth 144C. Any desired number of notional subgrade depths and associated seals may be provided.

Still referring to FIG. 1F, the compressible foam ball plugs 142 may be placed below the desired subgrade depth 144A, 144B, 144C by forcing them along the interior of the pipes 114 using a rod 146 having depth markings 148.

As described above, in some embodiments, one or more seals may comprise a compressible foam cylinder 142A. The compressible foam cylinder plug 142A may simply be forced into position using the rod 146 similarly to the ball seals (e.g. ball plugs 142), or be compressed and vacuum-sealed inside an air-impermeable barrier membrane so as to form a compressed "packet" that can easily fit within the interior of the pipe 114. This packet can then be lowered to the desired depth and then the barrier membrane can be ruptured to permit the cylinder plug 142A to expand against the interior wall of the pipe 114.

As also mentioned above, in some embodiments, one or more seals may comprise a gel plug 142B. A gel plug 142B may comprise a sealed water-soluble tube filled with water absorbent yarn. The water soluble tube can be lowered to the desired depth and suspended in place using a string line. The water-soluble tube remains in place until it is dissolved, which then allows water to reach the water absorbent yarn. The yarn expands to fill the interior of the pipe 114 and provide a gel plug over a desired interval.

Figure 1G:
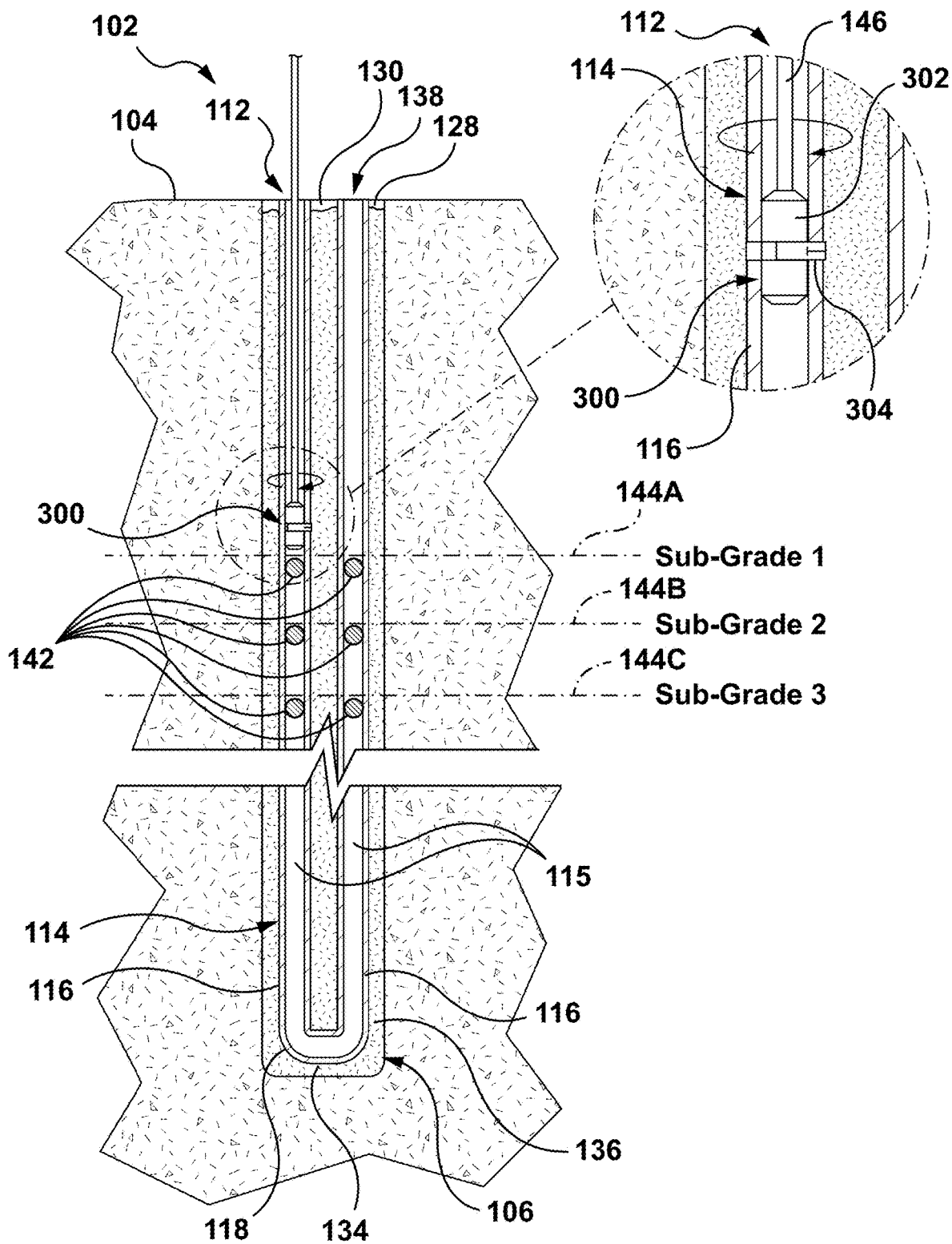
FIG. 1G shows cutting of the heat exchanger of FIGS. 1B and 1Ba above the uppermost seal(s) of FIG. 1F.

Reference is now made to FIG. 1G. After sealing the heat exchanger 112, the heat exchanger 112 is cut above the uppermost seal(s) 142. It will be appreciated that cutting the heat exchanger 112 above the uppermost seal(s) 142 means that the heat exchanger 112 is also cut above the lowermost seal(s) since the uppermost seal(s) 142 will necessarily be above the lowermost seal(s) 142. In the illustrated embodiment, each of the arms 116 of the pipe 114 is cut above the ball seals (e.g. ball plugs 142) positioned immediately below the first notional subgrade depth 144A. Cutting of the heat exchanger 112 may be carried out using any suitable technique; preferably, as shown in FIG. 1G, the cutting is carried out by inserting a specialized pipe cutting tool 300 into the open proximal end 138 and cutting the heat exchanger 112 (e.g. cutting the arms 116 of the pipe 114) from the inside. As shown in the enlarged portion of FIG. 1G, the illustrative pipe cutting tool 300 comprises a main body 302 and a retractable cutting arm 304 and can be mounted on the end of the depth-marked rod 146 so that it can be advanced to the desired depth. The illustrative pipe cutting tool 300 will be described in more detail below.

Figure 1H:
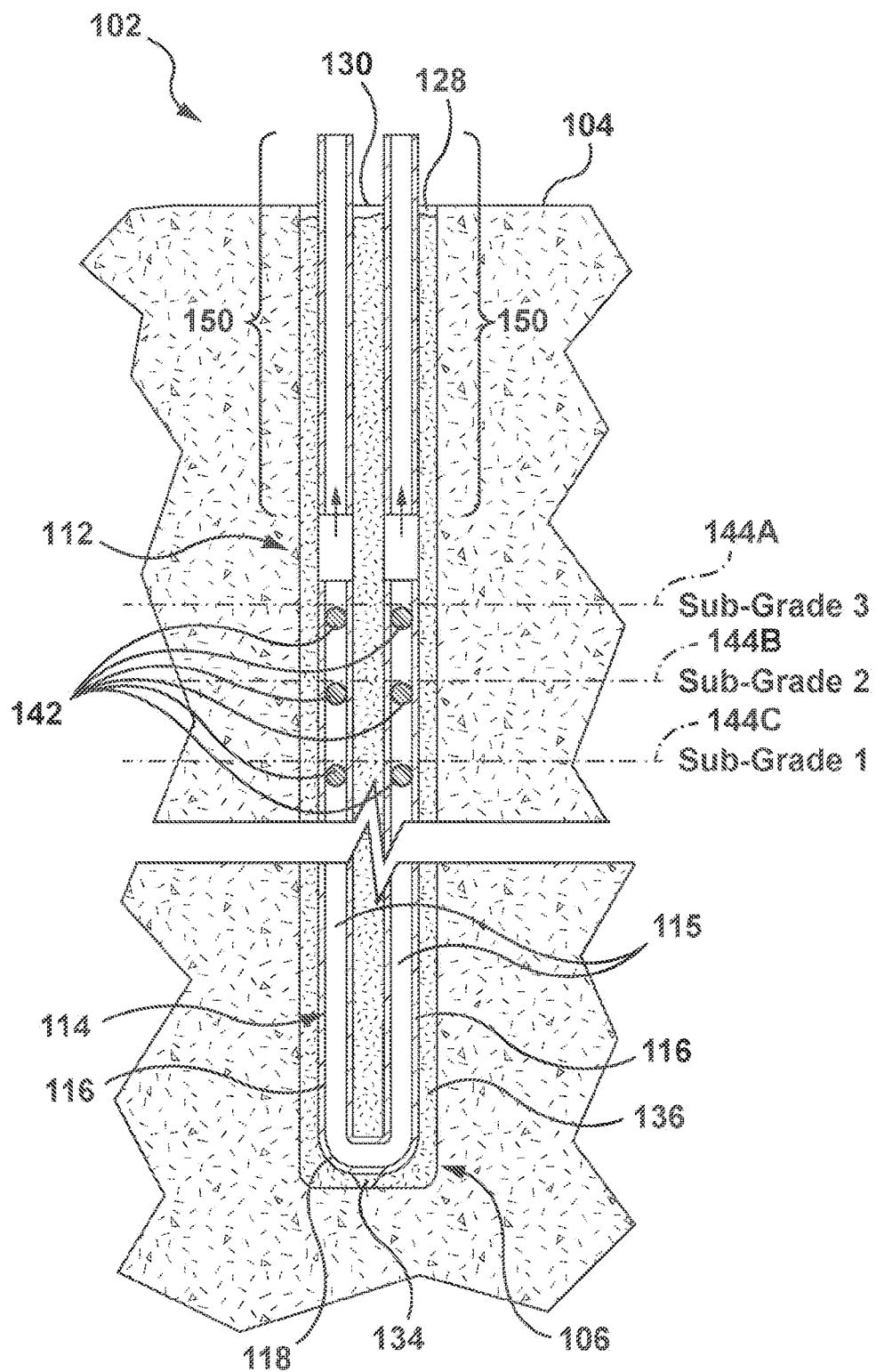
FIG. 1H shows removal of above-seal cut portions of the heat exchanger of FIGS. 1B and 1Ba.

Referring now to FIG. 1H, cutting of the heat exchanger 112 produces two above-seal cut portions 150 (one for each arm 116 of the pipe 114) of the heat exchanger 112. (In the case of a co-axial heat exchanger, there may be only a single cut portion, and in the case of a multiple-U-loop heat exchanger, there would be more than two cut portions.) The cut portions 150 are located above the uppermost seals, hence the term "above-seal"; in the illustrated embodiment this is above the ball seals (e.g. ball plugs 142) positioned immediately below the first notional subgrade depth 144A. The cut portions 150 of the heat exchanger 112 are then removed from the borehole 106, e.g. by mechanical or manual pulling, leaving only the grout 136 above the position where the heat exchanger 112 was cut. Thus, in the embodiment shown in FIGS. 1H and 1I, cutting the heat exchanger 112 and removing each above-seal cut portion 150 of the heat exchanger 112 is carried out before excavation of the portion 140 of the site 102 immediately surrounding the borehole 106.

Figure 1I:
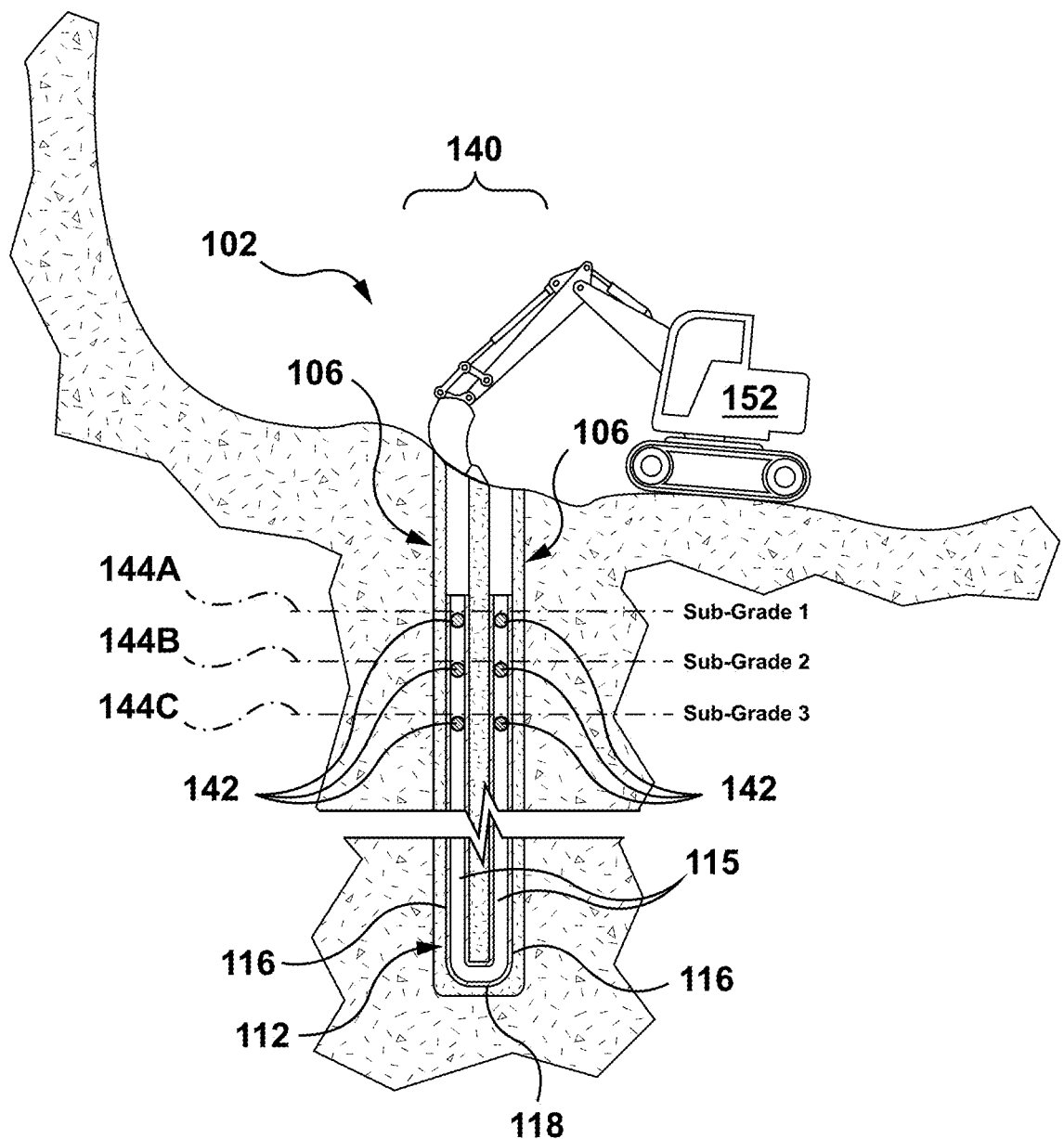
FIGS. 1I and 1Ia show excavation of the portion of the site immediately surrounding the borehole of FIG. 1.
Figure 1I:
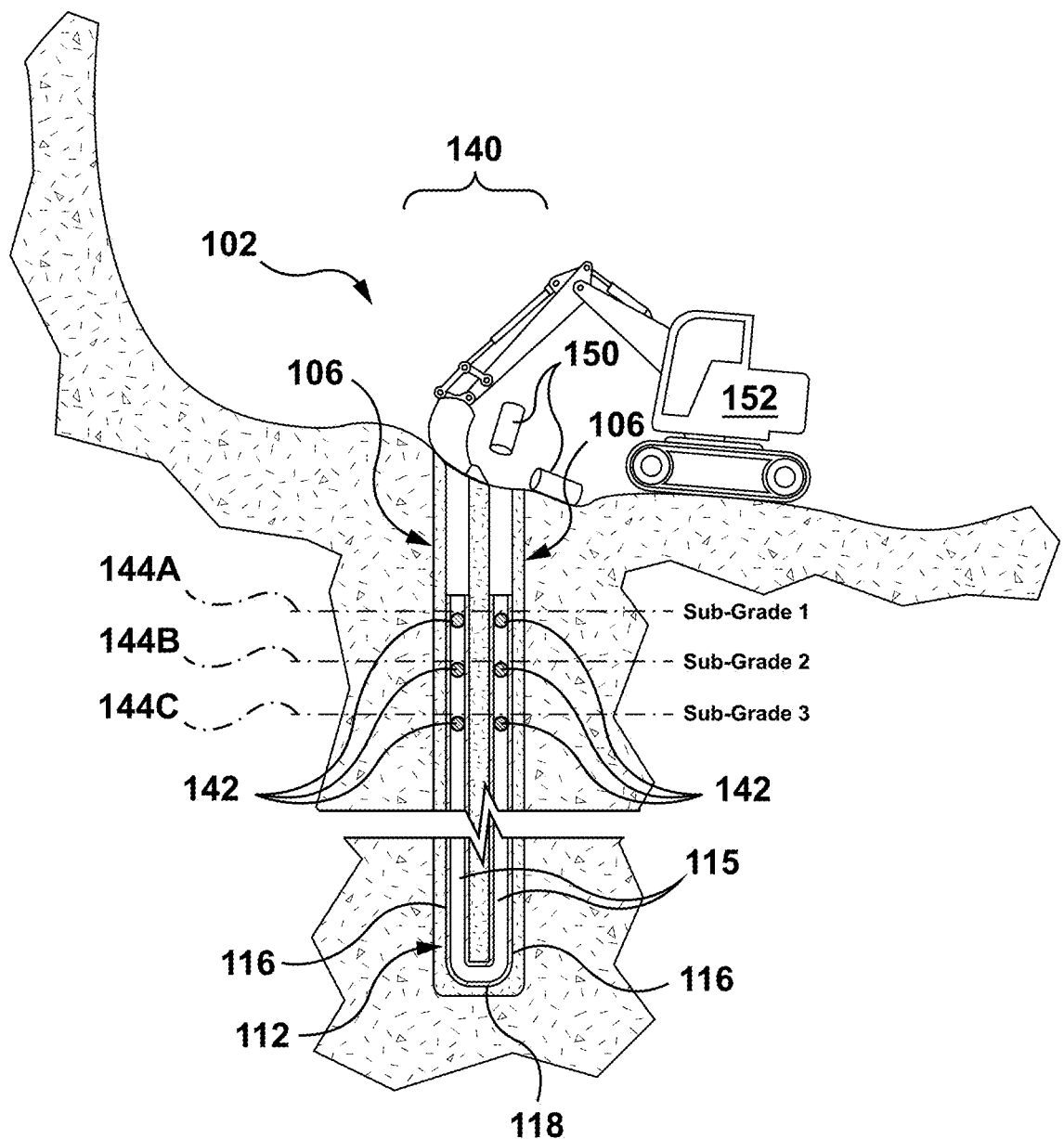

Turning to FIG. 1I, after cutting the heat exchanger 112 above the uppermost seal(s) and removing the above-seal cut portions 150 of the heat exchanger 112, excavation of the portion 140 of the site 102 immediately surrounding the borehole 106 can proceed. By cutting the heat exchanger 112 and removing the above-seal cut portions 150 prior to excavation, construction work can proceed without interference from heat exchanger piping. If it should become necessary to excavate to (e.g.) the second notional subgrade depth 144B or the third notional subgrade depth 144C, the cutting procedure can be repeated above the ball plugs 142 (or other seals) above the respective notional subgrade depth.

Alternatively, in some embodiments cutting the heat exchanger 112 and removing each above-seal cut portion 150 of the heat exchanger 112 may be carried out during excavation of the portion 140 of the site 102 immediately surrounding the borehole 106. More particularly, depending on the material from which the heat exchanger 112 is constructed, it may be more efficient and cost effective to allow portions above the seals (i.e. above seal cut portions 150) to be severed and removed by the excavation process itself (e.g. by construction equipment such as an excavator, bulldozer, backhoe, etc.). Thus, cutting may to be performed incidentally by excavating machinery 152 during excavation of the portion 140 of the site 102 immediately surrounding the borehole 106. This process is shown in FIG. 1Ia. If it is necessary to excavate below the first notional subgrade depth 144A to (e.g.) the second notional subgrade depth 144B or the third notional subgrade depth 144C, excavation can continue as long as the heat exchanger is not cut below the lowermost notional subgrade is depth (i.e. excavation remains above the lowermost of the seal(s) 142 in the heat exchanger 112).

Figure 1J:
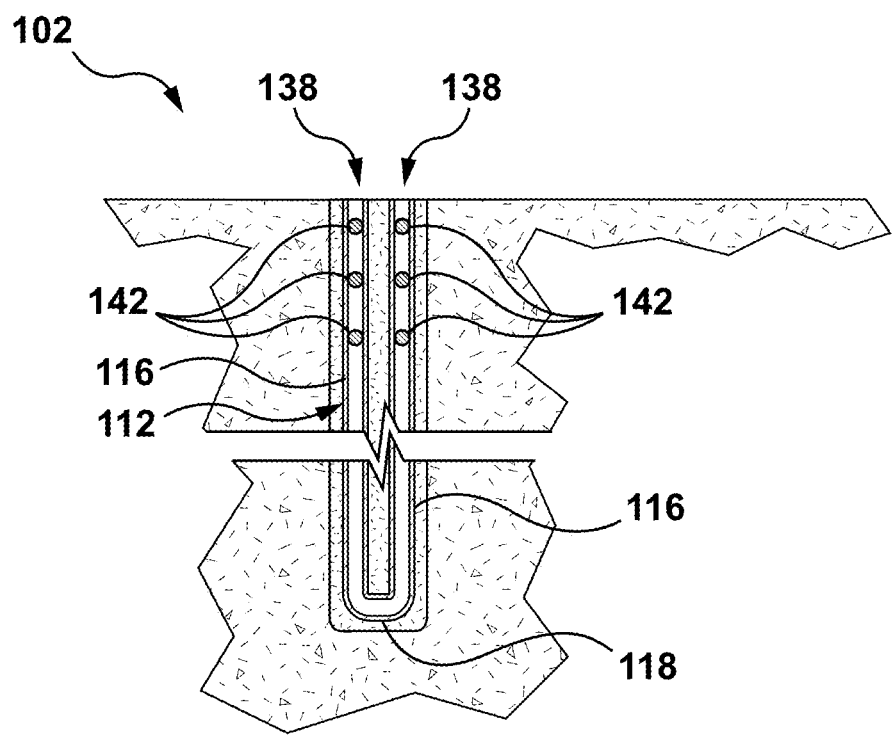
FIGS. 1J and 1K show removal of the seal(s) of FIG. 1F from the heat exchanger of FIGS. 1B and 1Ba.
Figure 1K:
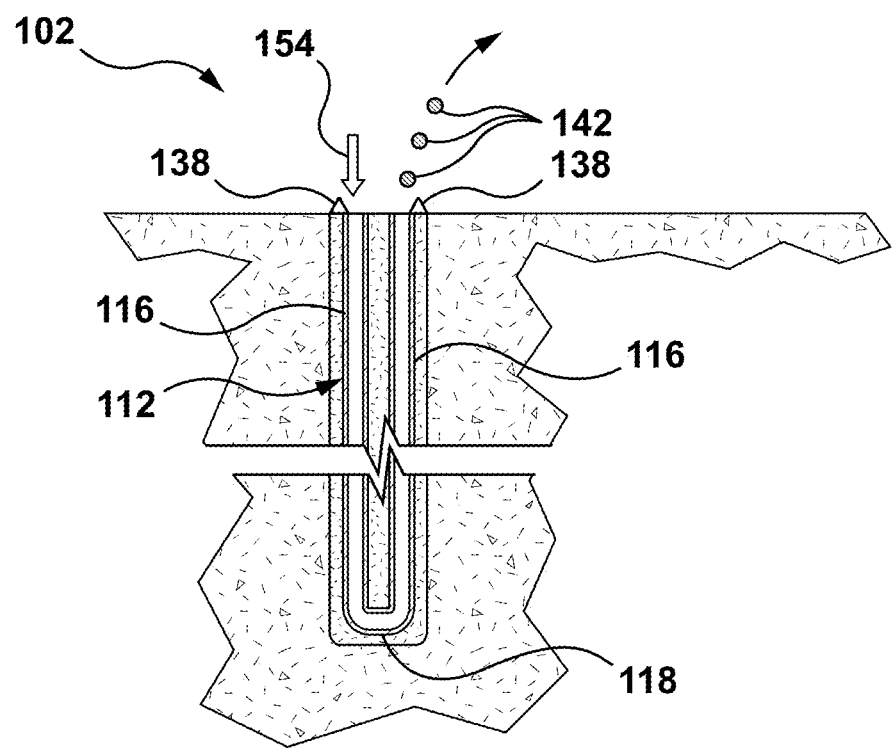
Figure 1L:
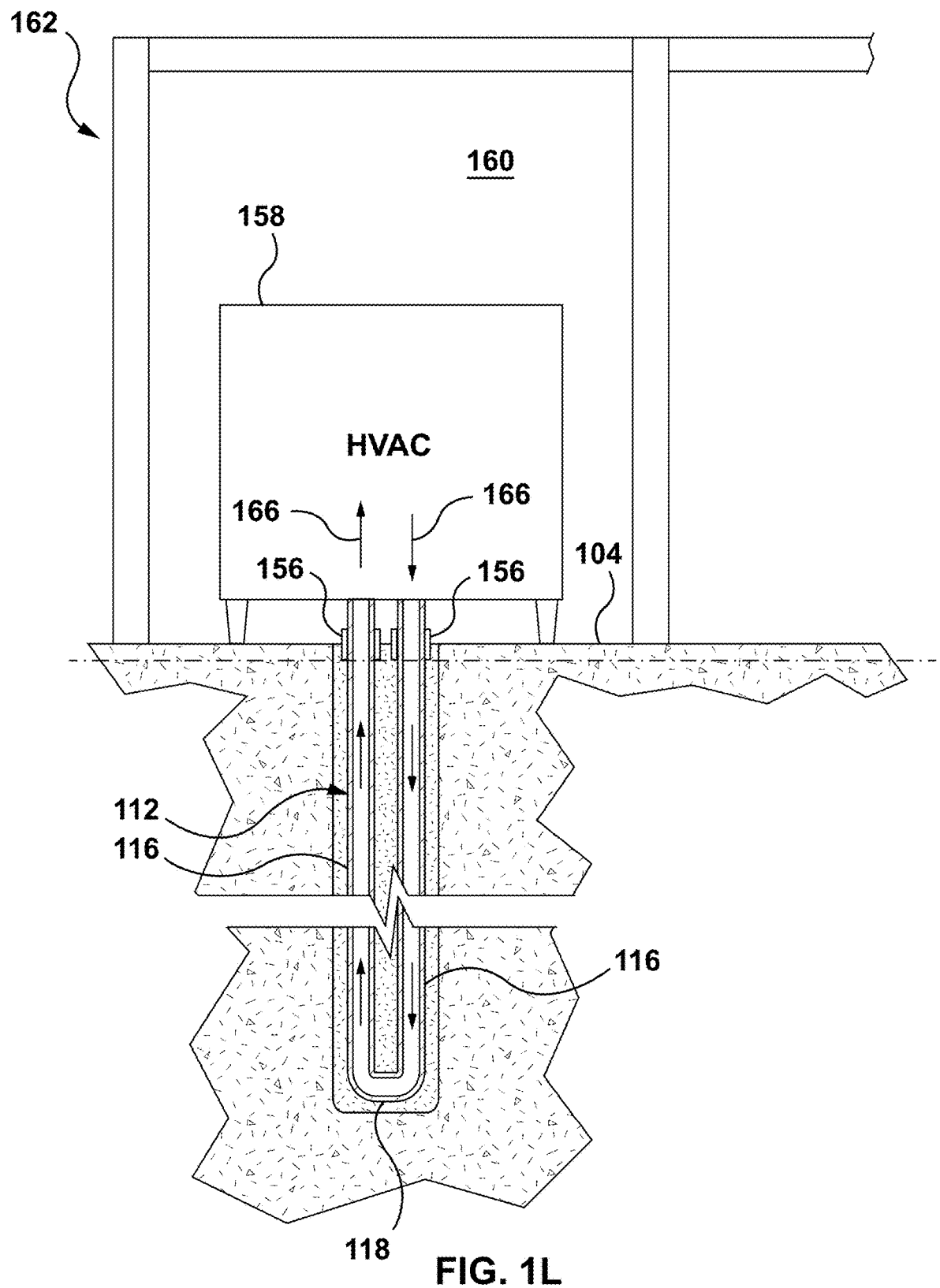
FIGS. 1L and 1M show connection of heat exchanger of FIGS. 1B and 1Ba to an HVAC system.
Figure 1M:
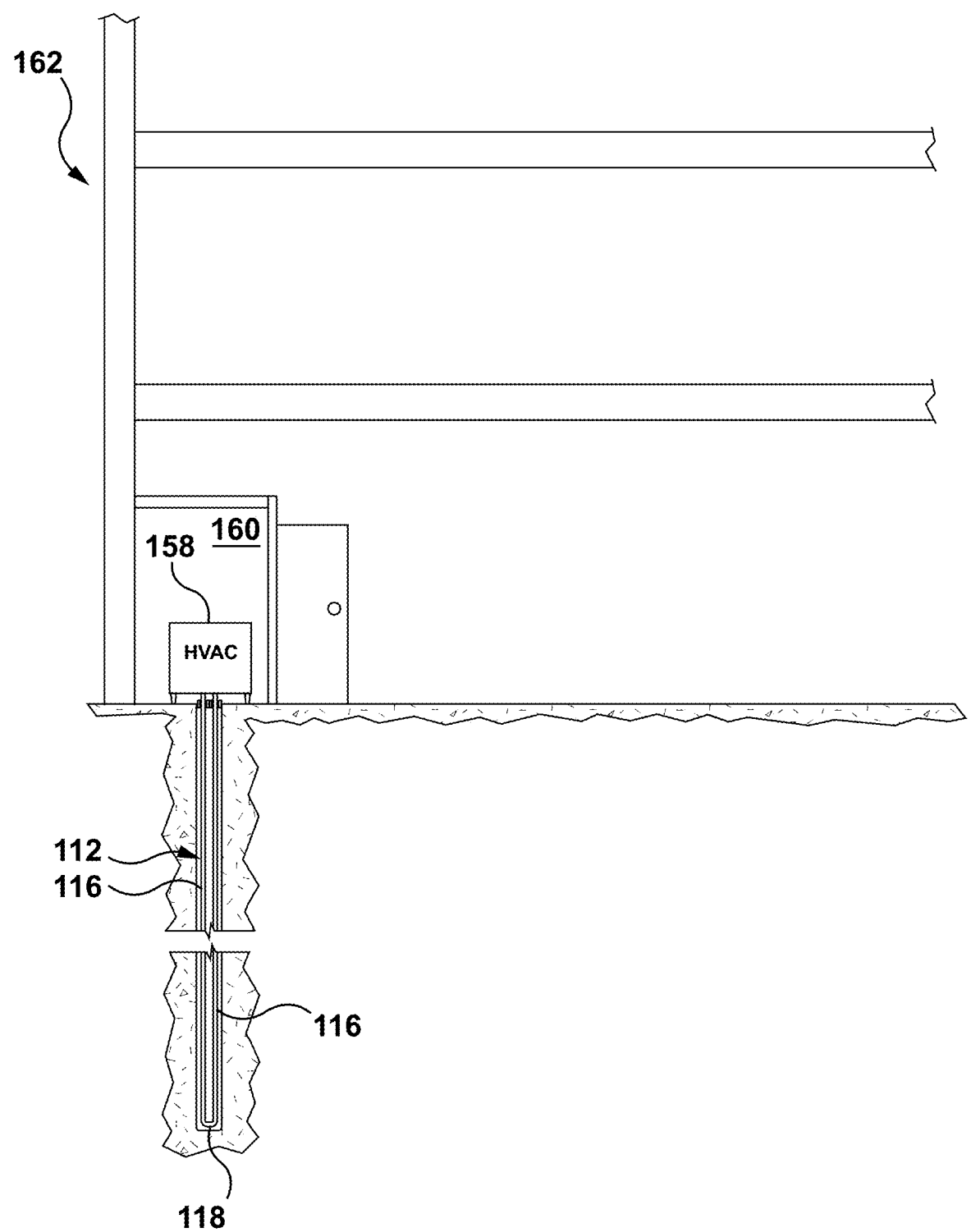

In either case (removal of above-seal cut portion 150 before excavation or during excavation), after completing excavation of the portion 140 of the site 102 immediately surrounding the borehole 106, the seals (e.g. ball plugs 142) can then be removed, as shown in FIGS. 1J and 1K. As can be seen in the Figures, in preferred embodiments the installation fluid 115 remains in the heat exchanger 112 during securing of the heat exchanger 112 in the borehole 106, and through temporarily sealing of the heat exchanger 112, cutting of the heat exchanger 112 and excavation of the portion 140 of the site 102 immediately surrounding the borehole 106. As such, removal of the seals (e.g. ball plugs 142) can be achieved by supplying pressurized fluid, denoted by arrow 154 in FIG. 1K, at the open end 138 of one arm 116 of the heat exchanger 112 which will then force the ball plugs 142 (or other seals) out of the open end 138 of the other arm 116 of the heat exchanger 112. Thus the seals (e.g. ball plugs 142) can be removed for connection of the heat exchanger 112 to supply/return conduits 156, for example of an HVAC system 158 in a mechanical room 160 of a multi-level parking garage 162, as shown in FIGS. 1L and 1M. This permits a heat exchanger fluid (e.g. water with corrosion inhibitor and antifreeze such as ethanol or propylene glycol), shown by arrows 166, to be passed from the HVAC system through the heat exchanger 112.

Figure 3A:
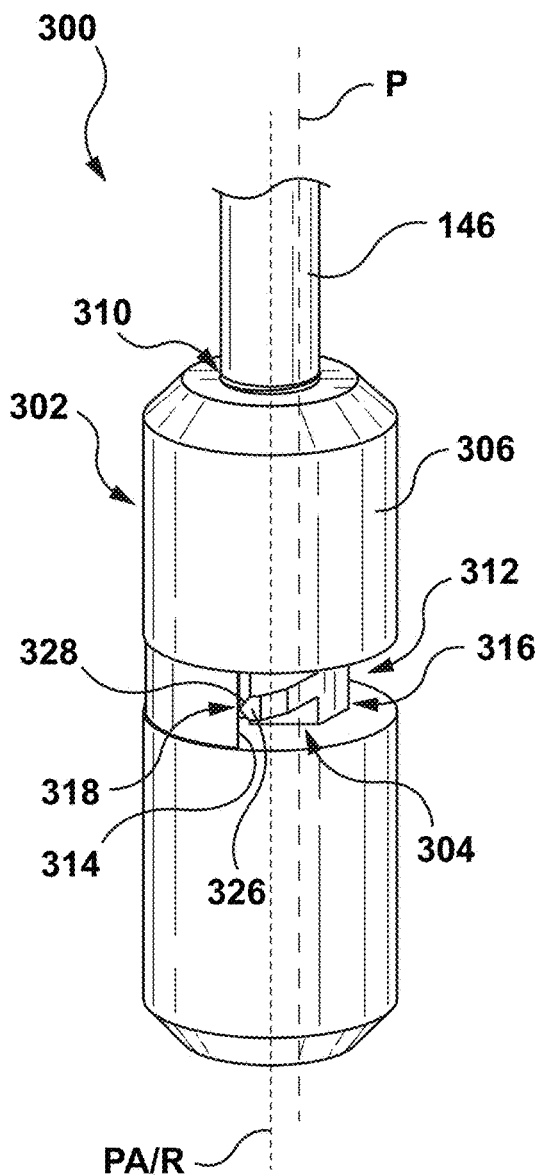
FIG. 3A is a perspective view of an illustrative pipe cutting tool according to an aspect of the present disclosure, showing a cutting arm thereof in a retracted position.
Figure 3B:
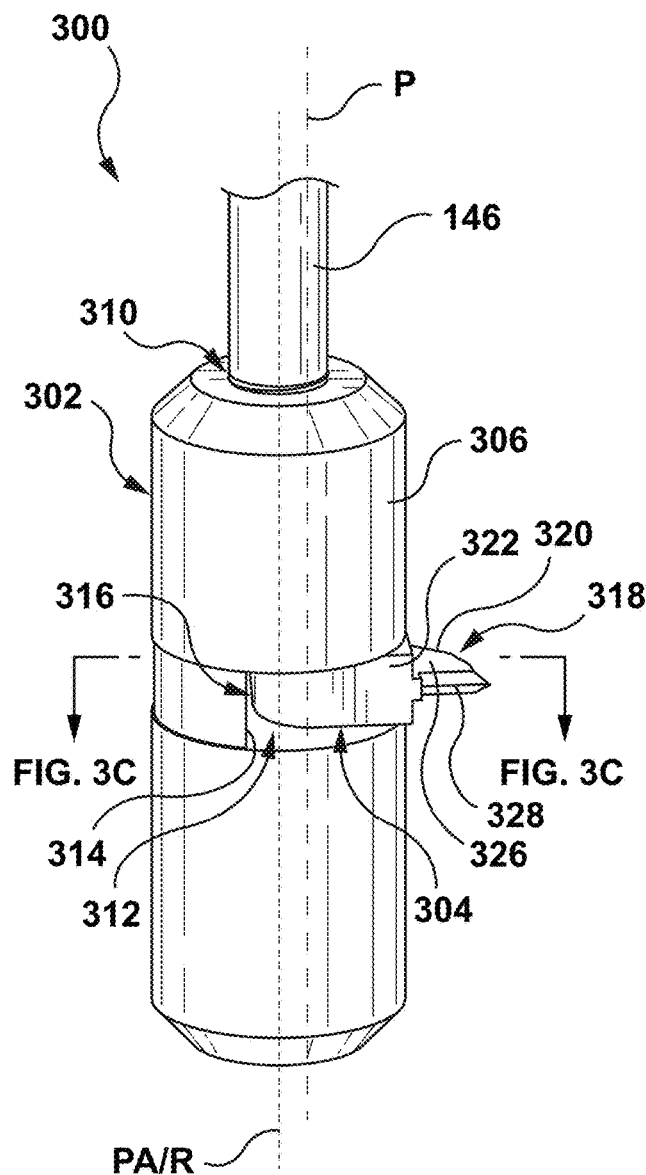
FIG. 3B is a perspective view of the pipe cutting tool of FIG. 3A, showing the cutting arm thereof in an extended position.

Reference is now made to FIGS. 3A to 3K, which show the illustrative pipe cutting tool 300 in more detail. As noted above, the illustrative pipe cutting tool 300 comprises a main body 302 and a cutting arm 304. The main body 302 has an axially-extending outer guide surface 306 adapted to guide the main body 302 axially along the inside of a pipe 308 (FIGS. 3C to 3E) along a pipe axis PA (FIGS. 3A to 3B). The pipe axis PA corresponds to the longitudinal extent of the pipe 308. In the illustrated embodiment the main body 302 is substantially cylindrical with tapered ends although other shapes are contemplated; in other embodiments the guide surface may include bearings adapted to engage the inside of the pipe.

One axial end of the main body 302 has an axially aligned drive rod recess 310 (see FIGS. 3D and 3E) that is threaded for threadedly receiving a drive rod, such as the depth-marked rod 146, for driving the pipe cutting tool 300 along the inside of the pipe 308.

An arm recess 312 is formed in the guide surface 306 of the main body 302 to receive the cutting arm 304, and a stop surface 314 is disposed in the arm recess 312. The cutting arm 304 has a pivot end 316 and a cutting end 318 opposite the pivot end 316, with a back-edge 320 and a cutting edge 322 extending between the pivot end 316 and the cutting end 318. The back-edge 320 and a cutting edge 322 are generally opposed to one another. The pivot end 316 has a cam surface 324 and the cutting end 318 has a cutting head 326 disposed along the cutting edge 322. The cutting head 326 carries a blade 328 facing the cutting edge 322. The cutting head 326 may be adapted to receive a replaceable blade, or may have an integral blade, in which case the cutting head itself may be replaceable. Alternatively, the entire cutting arm 304 may be replaced if the blade 328 becomes dull.

The cutting arm 304 is pivotally coupled at its pivot end 316 to the main body 302 within the arm recess 312 so as to be pivotable, relative to the main body 302, about a pivot axis P that is substantially parallel to the pipe axis PA. The pivot axis P of the cutting arm 304 is laterally offset from a central rotational axis R of the main body 302 that is, when the cutting tool 300 is inside the pipe 308, parallel to, and typically coincident with, the pipe axis PA. Thus, the pivot axis P of the cutting arm 304 will be laterally offset from the pipe axis PA. The cutting arm 304 can pivot between a retracted position, as shown in FIGS. 3A, 3D, 3F, 3H and 3J, and an extended position, as shown in FIGS. 3B, 3C, 3E, 3G, 3I and 3K. In the retracted position, the cutting arm 304 is retracted into the arm recess 312 so that the cutting edge 322 faces and may engage the stop surface 314. In the extended position, the cutting end 318 of the cutting arm 304 extends beyond the guide surface 306 to expose the cutting head 326 and the blade 328 and the cam surface 324 on the pivot end 316 engages the stop surface 314 to brace the cutting arm 304 against force applied to the cutting head 326 on the cutting edge side thereof (i.e. against pressure applied to the blade 328).

Figure 3C:
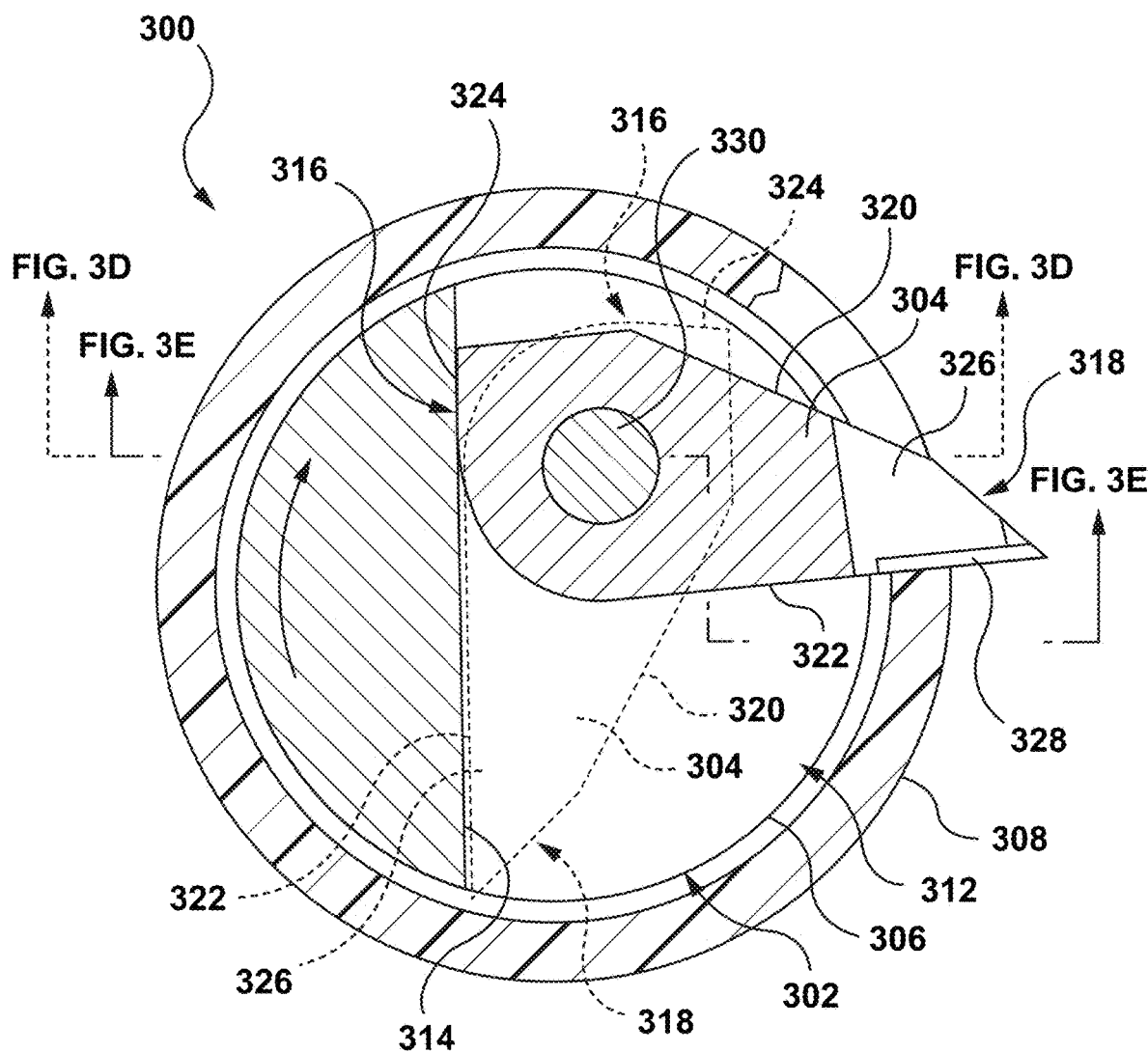
FIG. 3C is a cross-sectional view of the pipe cutting tool of FIG. 3A, taken along the line 3C-3C in FIG. 3B and shown inside a pipe.
Figure 3D:
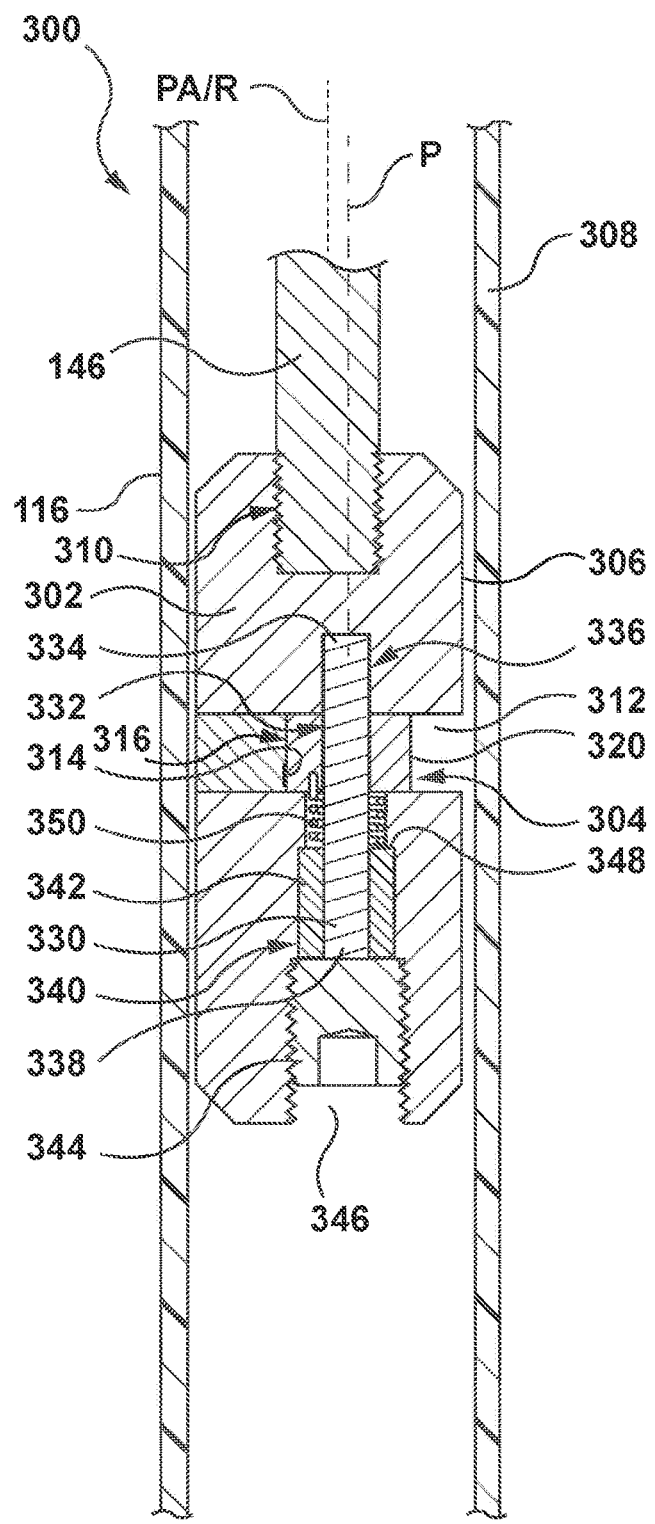
FIG. 3D is a cross-sectional view of the pipe cutting tool of FIG. 3A, taken along the line 3D-3D in FIG. 3B and showing the cutting arm in a retracted position.
Figure 3E:
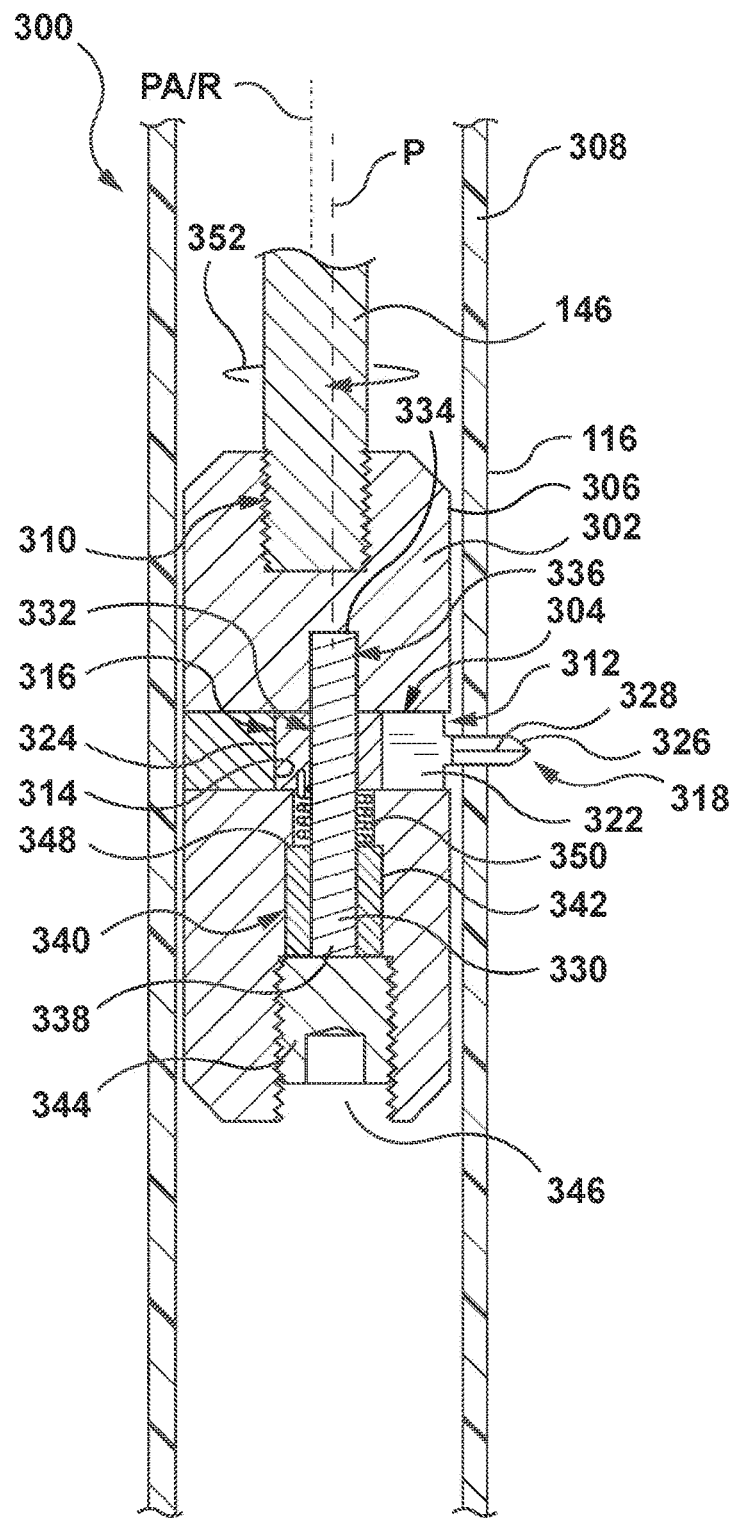
FIG. 3E is a cross-sectional view of the pipe cutting tool of FIG. 3A, taken along the line 3E-3E in FIG. 3B and showing the cutting arm in an extended position.
Figure 3J:
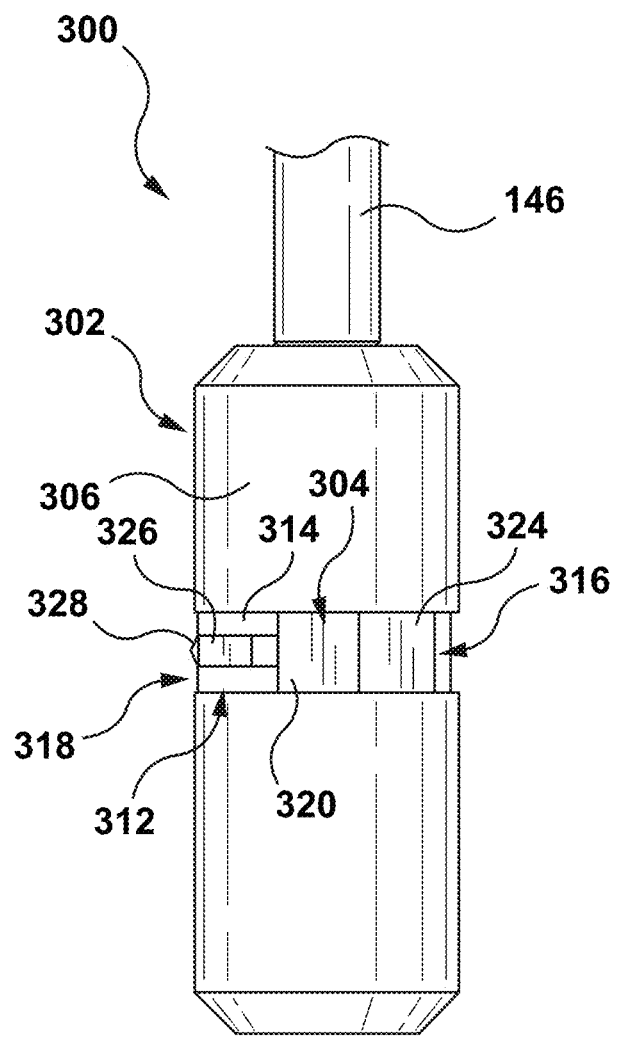
FIG. 3J is a second side elevation view of the pipe cutting tool of FIG. 3A, showing the cutting arm in a retracted position.
Figure 3K:
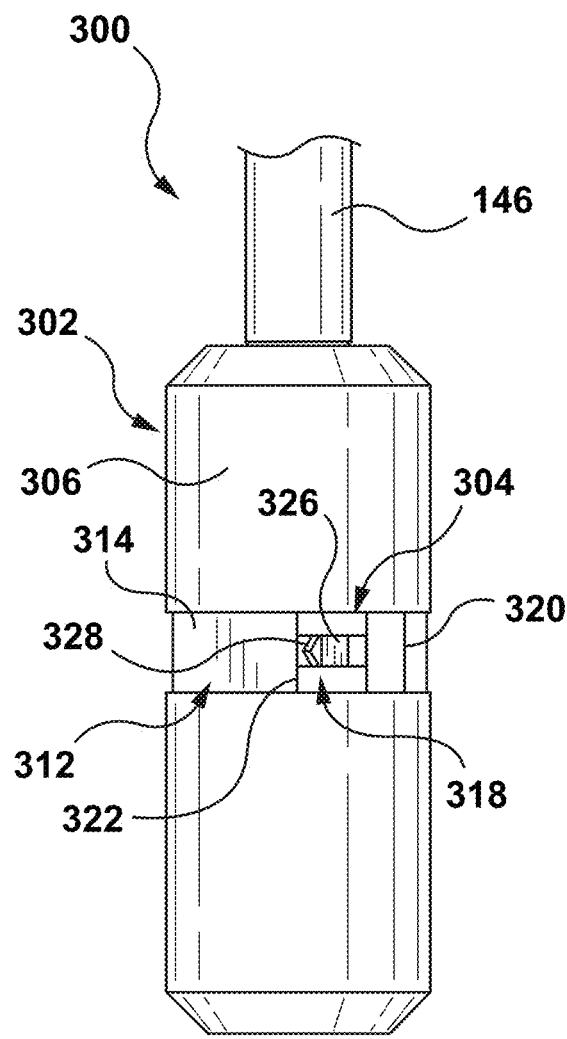
FIG. 3K is the same side elevation view as in FIG. 3J, showing the cutting arm in an extended position.

As best seen in FIGS. 3D and 3E, in the illustrated embodiment, the cutting arm 304 is pivotally coupled to the main body 302 by a pivot pin 330 passing through a pivot aperture 332 in the pivot end 316 of the cutting arm 304. One end 334 of the pivot pin 330 is received in a pivot pin recess 336 on the same axial side of the arm recess 312 as the drive rod recess 310 and the other end of the pivot pin 330 is received in a bushing receptacle 340. A bushing 342 (or alternatively a bearing such as a needle bearing) is disposed in the bushing receptacle 340 on the opposite axial side of the arm recess 312 from the drive rod recess 310, and the other end of the pivot pin 330 is journalled in the bushing 342. The bushing 342 is maintained in the bushing receptacle 340 by a setscrew 344 that is threadedly received in a setscrew recess 346 on the opposite axial side of the arm recess 312 from the drive rod recess 310. More particularly, the setscrew 344 traps the bushing 342 against a bushing shoulder 348.

A biasing member acts between the main body 302 and the cutting arm 304 to urge the cutting arm 304 toward the extended position. In the illustrated embodiment, the biasing member takes the form of a coil spring 350. The coil spring 350 surrounds the pivot pin 330; with one terminal arm of the coil spring 350 engaging the main body 302 and the other terminal arm of the coil spring 350 engaging the cutting arm 304.

In operation, the cutting arm 304 is placed into the retracted position, and the cutting tool 300 is inserted into the inside of the pipe 308. Despite the force exerted by the coil spring 348, as long as the cutting tool 300 is advanced axially along the pipe 308 without rotation, the wall of the pipe 308 will maintain the cutting arm 304 substantially in the retracted position. More particularly, the back-edge 320 of the cutting arm 304 will engage the inner surface 350 of the pipe 308, so that even if the cutting arm 304 moves slightly of the fully retracted position, the cutting arm 304 cannot move fully into the extended position and the cutting edge side of the cutting head 326 having the blade 328 is not exposed. Moreover, while advancing the cutting tool 300 along the pipe 308, rotating the main body 302 in the same direction that the cutting arm 304 pivots from the retracted position to the extended position can assist in preventing the cutting arm 304 from pivoting into the extended position.

Once the cutting tool 300 has been advanced to the desired position in the pipe 308, the cutting arm 304 can be moved into the extended position by rotating the main body 302 opposite to the direction that the cutting arm 304 pivots from the retracted position to the extended position, as shown by arrow 352 in FIGS. 3E and 3F. Because the pivot axis P is laterally offset from the central rotational axis R of the main body 302, this rotation will allow the cutting arm 304 to pivot, under urging from the coil spring 348, toward the extended position in which the cutting head 326 and the blade 328 are exposed. This is shown by arrow 354 in FIG. 3G. Once the cutting arm 304 reaches the extended position and is braced by the engagement of the cam surface 324 with the stop surface 314, continued rotation of the main body 302 will cause the blade 328 to cut into the pipe 308, as shown in FIGS. 3C and 3E, Rotation of the main body 302 can continue until the blade 328 has completely traversed the circumference of the pipe 308 so as to sever the pipe 308. The extended cutting arm 304 then acts as a hook to allow the upper portion of the severed pipe 308 (e.g. above-seal cut portion 150) to be pulled up and away.

Certain illustrative embodiments have been described by way of example. It will be apparent to persons skilled in the art that a number of variations and modifications can be made without departing from the scope of the claims.

What is claimed is:

1. A method of installing a geothermal heat exchanger, the method comprising:
   at a site, boring a borehole to a borehole target depth in the site;
   after boring the borehole, inserting a geothermal heat exchanger into the borehole to a desired heat exchanger depth,
   after inserting the heat exchanger into the borehole, securing the heat exchanger in the borehole at the desired heat exchanger depth;
   wherein, when the heat exchanger has been secured in the borehole:
      the heat exchanger has a closed distal end and an open proximal end;
      the heat exchanger has at least one fluid path between the closed distal end and the open proximal end; and
      installation fluid is disposed in each of the at least one fluid path of the heat exchanger; and
   after securing the heat exchanger in the borehole and before excavation of a portion of the site immediately surrounding the borehole, and without withdrawing the heat exchanger from the borehole, temporarily sealing the heat exchanger between the closed distal end and the open proximal end by installing, through the open proximal end, at least one respective internal seal in each of the at least one fluid path, wherein for each of the at least one fluid path, the at least one internal seal is disposed below a respective notional subgrade depth;
   after temporarily sealing the heat exchanger, cutting the heat exchanger above an uppermost one of the at least one seal to produce at least one above-seal cut portion of the heat exchanger;
   after cutting the heat exchanger, removing each above-seal cut portion of the heat exchanger and excavating the portion of the site immediately surrounding the borehole;
   wherein excavating the portion of the site immediately surrounding the borehole is above a lowermost of the notional subgrade depth; and
   after excavating the portion of the site immediately surrounding the borehole, removing the seals for connection of the heat exchanger to supply/return conduits.

2. The method of claim 1, wherein cutting the heat exchanger and removing each above-seal cut portion of the heat exchanger is carried out before excavation of the site.

3. The method of claim 1, wherein cutting the heat exchanger is carried out by inserting a pipe cutting tool into the open proximal end and cutting the heat exchanger from the inside.

4. The method of claim 1, wherein cutting the heat exchanger and removing each above-seal cut portion of the heat exchanger is carried out during excavation of the site.

5. The method of claim 4, wherein cutting is performed by use of a pipe cutting tool.

6. The method of claim 4, wherein cutting is performed by excavating machinery during excavation of the portion of the site immediately surrounding the borehole.

7. The method of claim 1, further comprising:
   after securing the heat exchanger in the borehole and before excavation of the site, testing the heat exchanger.

8. The method of claim 1, wherein the installation fluid remains in the heat exchanger during securing of the heat exchanger in the borehole and temporarily sealing the heat exchanger.

9. The method of claim 1, wherein the heat exchanger is a U-loop.

10. The method of claim 9, wherein the heat exchanger is a single U-loop.

11. The method of claim 9, wherein the heat exchanger is a multiple U-loop.

12. The method of claim 1, wherein the heat exchanger is at least an outer tube of a concentric heat exchanger.

* * * * *